United States Patent
Hirose et al.

(10) Patent No.: US 8,274,699 B2
(45) Date of Patent: Sep. 25, 2012

(54) APPARATUS AND METHOD FOR CORRECTING REGISTRATION ERRORS AND TRAILING PHENOMENON IN A PRINTED IMAGE

(75) Inventors: Hideki Hirose, Tokyo (JP); Takehito Utsunomiya, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 842 days.

(21) Appl. No.: 12/372,116

(22) Filed: Feb. 17, 2009

(65) Prior Publication Data

US 2009/0207430 A1    Aug. 20, 2009

(30) Foreign Application Priority Data

Feb. 20, 2008  (JP) ................................. 2008-039270

(51) Int. Cl.
G06F 15/00       (2006.01)
(52) U.S. Cl. ....... 358/1.9; 345/698; 358/3.13; 358/3.14; 358/3.26; 358/3.06
(58) Field of Classification Search ................... 358/1.9, 358/1.1, 2.1, 3.06, 3.13, 3.14, 3.26; 345/469, 345/589, 611, 613, 698; 382/224
See application file for complete search history.

(56) References Cited

U.S. PATENT DOCUMENTS

| 5,148,500 | A | * | 9/1992 | Belanger .................. 382/259 |
| 5,224,179 | A | * | 6/1993 | Denker et al. ............. 382/259 |
| 5,272,763 | A | * | 12/1993 | Maruyama et al. .......... 382/147 |
| 5,535,019 | A | * | 7/1996 | Eschbach ................... 358/3.03 |
| 2001/0055120 | A1 | * | 12/2001 | Sawada et al. .............. 358/1.9 |
| 2004/0218220 | A1 | * | 11/2004 | Thompson et al. ......... 358/3.03 |
| 2006/0153449 | A1 | * | 7/2006 | Park et al. .................. 382/173 |
| 2009/0141319 | A1 | | 6/2009 | Utsunomiya et al. | |

FOREIGN PATENT DOCUMENTS

| JP | 2000-175029 | 6/2000 |
| JP | 2004-170755 | 6/2004 |

* cited by examiner

*Primary Examiner* — King Poon
*Assistant Examiner* — David S Cammack
(74) *Attorney, Agent, or Firm* — Fitzpatrick, Cella, Harper & Scinto

(57) ABSTRACT

A color image forming apparatus is provided that forms an image by correcting registration shifts during an image forming process by using image data and which prevents toner from being blown away and scattered during a fixing process by thinning pixels without making an erroneous decision. When multivalued color image is binarized, the threshold is corrected by using information on grayscale level correction. Further, when trailing phenomenon prevention operation is performed on the binarized image data, the patterns to be used for pattern matching are changed and selected according to whether the subscan direction line shifting point lies within the reference window.

10 Claims, 22 Drawing Sheets

| FIG.1A | FIG.1B | FIG.1C |
|---|---|---|

INCLINATION

BIT MAP IMAGE
(BEFORE GRAYSCALE LEVEL CORRECTION)

CORRECTED BIT MAP IMAGE

BIT MAP IMAGE
(AFTER GRAYSCALE LEVEL CORRECTION)

EXPOSED IMAGE

INCLINATION

BIT MAP IMAGE
(BEFORE GRAYSCALE LEVEL CORRECTION)

BIT MAP IMAGE
(AFTER TRAILING PHENOMENON
PREVENTION OPERATION)

CORRECTED BIT MAP IMAGE

CORRECTED BIT MAP IMAGE
(SUBSCAN DIRECTION OFFSET OPERATION)

PRINTED RESULT
(ON PRINT MEDIUM)

BIT MAP IMAGE
(AFTER TRAILING PHENOMENON
PREVENTION OPERATION)

| REGION | WIDTH (mm) | INCLINATION (mm) |
|---|---|---|
| REGION 1 | L1 | m1 |
| REGION 2 | L2 | m2 |
| REGION 3 | L3 | m3 |

FIG.12

WEAK

WEAK

MEDIUM

MEDIUM

STRONG

STRONG

STRONG

| FIG.14A |
| FIG.14B |

- ⬚ DON'T CARE
- ▨ PIXEL OF INTEREST
- ⬚ 0
- ⬚ 1

- ⬚ DON'T CARE
- ▨ PIXEL OF INTEREST
- ⬚ 0
- ⬚ 1

- ⬚ DON'T CARE
- ▨ PIXEL OF INTEREST
- ⬚ 0
- ⬚ 1

- ⬚ DON'T CARE
- ▨ PIXEL OF INTEREST
- ⬚ 0
- ⬚ 1

Cnt=1

FIG.17A

Cnt=5

FIG.17B

Cnt=6

FIG.17C

Cnt=9

FIG.17D

Cnt=1

FIG.18A

Cnt=5

FIG.18B

Cnt=6

FIG.18C

Cnt=9

FIG.18D

| BLENDING DECISION RESULT | CORRECTION VALUE |
|---|---|
| 0b00 | 0 |
| 0b01 | 2 |
| 0b10 | 4 |
| 0b11 | 6 |

FIG.19

APPARATUS AND METHOD FOR CORRECTING REGISTRATION ERRORS AND TRAILING PHENOMENON IN A PRINTED IMAGE

BACKGROUND OF THE INVENTION

1. Field of the Invention

The present invention relates to an image forming apparatus and an image forming method which, during a process of forming an image, correct a bend of a scan line and control the amount of toner applied to a print medium.

2. Description of the Related Art

To achieve a faster image forming speed in an electro photo graphic color image forming apparatus, a growing number of tandem type color image forming apparatuses have come into use in recent years. Such apparatuses have the same number of developers and photosensitive drums as that of colorants and transfer images of different colors successively onto an image carrying belt or print medium. This tandem type color image forming apparatus is already known to have problems contributing to registration shifts and a variety of measures has been proposed to overcome each of the problems.

One of the problems is an unevenness of a lens of a deflection scanning device and a deviation of a mounting position of the lens, and a positional deviation of the deflection scanning device when mounted in a color image forming apparatus body. In such cases, a scan line tilts or bends and the degree of tilting or bending varies from one color to another, resulting in registration shifts among images of different colors.

To deal with this registration shift problem, a measure has been proposed (e.g., Japanese Patent Laid-Open No. 2004-170755) which involves measuring inclination and bend of the scan line by using an optical sensor, correcting bit map image data to cancel or offset measuring inclination and bend of the scan line, and forming the corrected image. This method can correct registration shifts at low cost because mechanical adjustment members and an adjusting step during assembly are obviated by the electrical correction of the image data. This electrical correction of registration shifts is done either in units of one pixel or in units of less than one pixel. In the case of the one-pixel correction, pixels are offset one pixel at a time in a subscan direction according to the amount of correction of inclination and bend, as shown in FIG. 6A-6C. That is, a line is switched to the adjoining line. In the case of the less-than-one-pixel correction, a grayscale value of bit map image data is adjusted using adjacent pixels in the subscan direction, as shown in FIG. 7A-7E. By executing the less-than-one-pixel correction, unnatural steps formed at boundaries offset by the one-pixel correction are eliminated thus smoothing the image (this process is hereinafter referred to as blending).

A heat-pressure fixing device to fix a toner image with heat and pressure, including devices of a heat roller type and a film heating type, is generally used as a fixing means. In an image forming apparatus with such a fixing device, a phenomenon may occur in which a part of the toner of an unfixed toner image on a print medium carried to the fixing device is blown upstream in the print medium transport direction immediately before a fixing nip portion. The blown toner shifts about 0.1-1 mm upstream in the print medium transport direction, making the image look as if it has trailing tails (ends). This is refereed to as a trailing with whisker-like image impairments (hereinafter referred to as a trailing phenomenon). When an image of lines extending in the main scan direction is printed, a problem would occur in which toner applied to the print medium 11 at the rear edge of lines 81 in the subscan direction is scattered, disturbing the printed image, as shown in FIG. 8.

This problem is known to occur under a normal office environments, particularly at high humidity. This is shown in FIG. 9. Water in the print medium 11 is explosively vaporized by a rapid temperature increase and pressing forces of upper and lower rollers (fixing roller 32 and pressure roller 33), with the vapor escaping from a relatively weakly bound rear edge of the deposited toner, scattering the toner in the process. This phenomenon is empirically known to be likely to occur when the width of toner lines in the subscan direction is about 100-1000 µm.

To tackle the above problem, a method (Japanese Patent Laid-Open No. 2000-175029 for example) has been proposed which involves selecting and extracting an image pattern, thinning an image area at a predetermined rate by using the extracted image pattern, and changing an image data thinning method according to an area of the image pattern.

However, when the above electrical registration shift correction and the trailing phenomenon prevention operation are to be executed at the same time, the following problem arises.

Executing the trailing phenomenon prevention operation before the subscan direction line shifting to the next line causes execution of a grayscale correction of less than 1 pixel because the trailing phenomenon prevention operation is followed by the subscan direction line shifting and the image smoothing or blending. Since the image correction is performed even after a decision on the trailing phenomenon prevention operation is made, there is a possibility that the trailing phenomenon may occur even where the trailing phenomenon prevention operation is decided to be unnecessary. This is explained referring to FIG. 10A-10F. The trailing phenomenon prevention operation is performed on an original bit map image. Two pixels 1001, 1002 hit the pattern matching in the trailing phenomenon prevention operation and are eliminated. This is followed by the subscan direction line shifting and the blending operation. Since the decision on blending is based on various image patterns, the amount of toner applied to the print medium changes depending on the decision made. Thus, prior to the subscan direction line shifting and blending operation, there is a possibility that even where the trailing phenomenon prevention operation is decided to be unnecessary, an image printed on a print medium may eventually have a trailing phenomenon. In that case, as shown in FIG. 11, pixels 1003 and 1004 should have also been removed in addition to the pixels 1001, 1002. As described above, the blending operation may cause an erroneous decision to be made as to whether or not to perform the thinning operation.

Another problem is that if the decision on the trailing phenomenon prevention operation is made after the subscan direction line shifting and the blending decision, the fact that the image is changed in the subscan direction when the image pattern is chosen prevents a correct pattern from being extracted before and after the line shifting.

This invention is intended to perform the trailing phenomenon prevention operation normally in a color tandem machine capable of electrically correcting registration shifts.

SUMMARY OF THE INVENTION

A color image forming apparatus of this invention forms an image by correcting registration shifts during an image forming process by using image data and comprises a means to correct registration shifts by performing a subscan direction line shifting according to an amount of registration shifts; a means to decide whether or not to correct grayscale levels of image data and use a threshold determined by a result of the decision in binarizing multivalued image data; a means to generate a reference window comprising a group of the binarized image data; a means to check whether a line shifting point is included in the generated reference window; a means, when the line shifting point is decided to be included in the reference window, to select a first pattern for line shifting pattern matching and, when the line shifting point is decided to be not included in the reference window, select a second pattern for normal pattern matching; a means, when the line shifting point is decided to be not included in the reference window, to compare the reference window with the first pattern and, when the line shifting point is decided to be included in the reference window, to compare the reference window for the second pattern with the second pattern; and a means, when the comparison by the comparing means finds that both match, to thin a pixel located at the pixel of interest in the reference window.

The image forming apparatus of this invention forms an image by correcting registration shifts during an image forming process by using image data and comprises a means to correct registration shifts by performing a subscan direction line shifting according to an amount of registration shifts; a means to decide whether or not to perform a grayscale level correction for an interpolation of less than one pixel of image data and use a threshold determined by a result of the decision in quantizing multivalued image data; a means to generate a reference window comprising a group of the quantized image data; and a means, when the reference window matches trailing phenomenon prevention patterns, to thin a pixel located at the pixel of interest in the reference window.

A color image forming method of this invention forms an image by correcting registration shifts during an image forming process by using image data and comprises a step to correct registration shifts by performing a subscan direction line shifting according to an amount of registration shifts; a step to decide whether or not to correct grayscale levels of image data and use a threshold determined by a result of the decision in binarizing multivalued image data; a step to generate a reference window comprising a group of the binarized image data; a step to check whether a line shifting point is included in the generated reference window; a step, when the line shifting point is decided to be included in the reference window, to select a first pattern for line shifting pattern matching and, when the line shifting point is decided to be not included in the reference window, to select a second pattern for normal pattern matching; a step, when the line shifting point is decided to be not included in the reference window, to compare the reference window with the first pattern and, when the line shifting point is decided to be included in the reference window, to compare the reference window for the second pattern with the second pattern; and a step, when the comparison by the comparing step finds that both match, to thin a pixel located at the pixel of interest in the reference window.

The computer-readable recording medium of the present invention stores a program to cause a computer to execute the above color image forming method.

The program of the present invention causes a computer to execute the above color image forming method.

Further features of the present invention will become apparent from the following description of exemplary embodiments (with reference to the attached drawings).

BRIEF DESCRIPTION OF THE DRAWINGS

FIG. 12 shows an example of information stored in a registration shifts memory means in the color image forming apparatus of the embodiment of this invention.

FIGS. 17A-17D show an example of pattern when a reference window includes an upward line shifting point, in the color image forming apparatus of the embodiment of this invention.

Figures 18A, 18B, 18C, 18D:
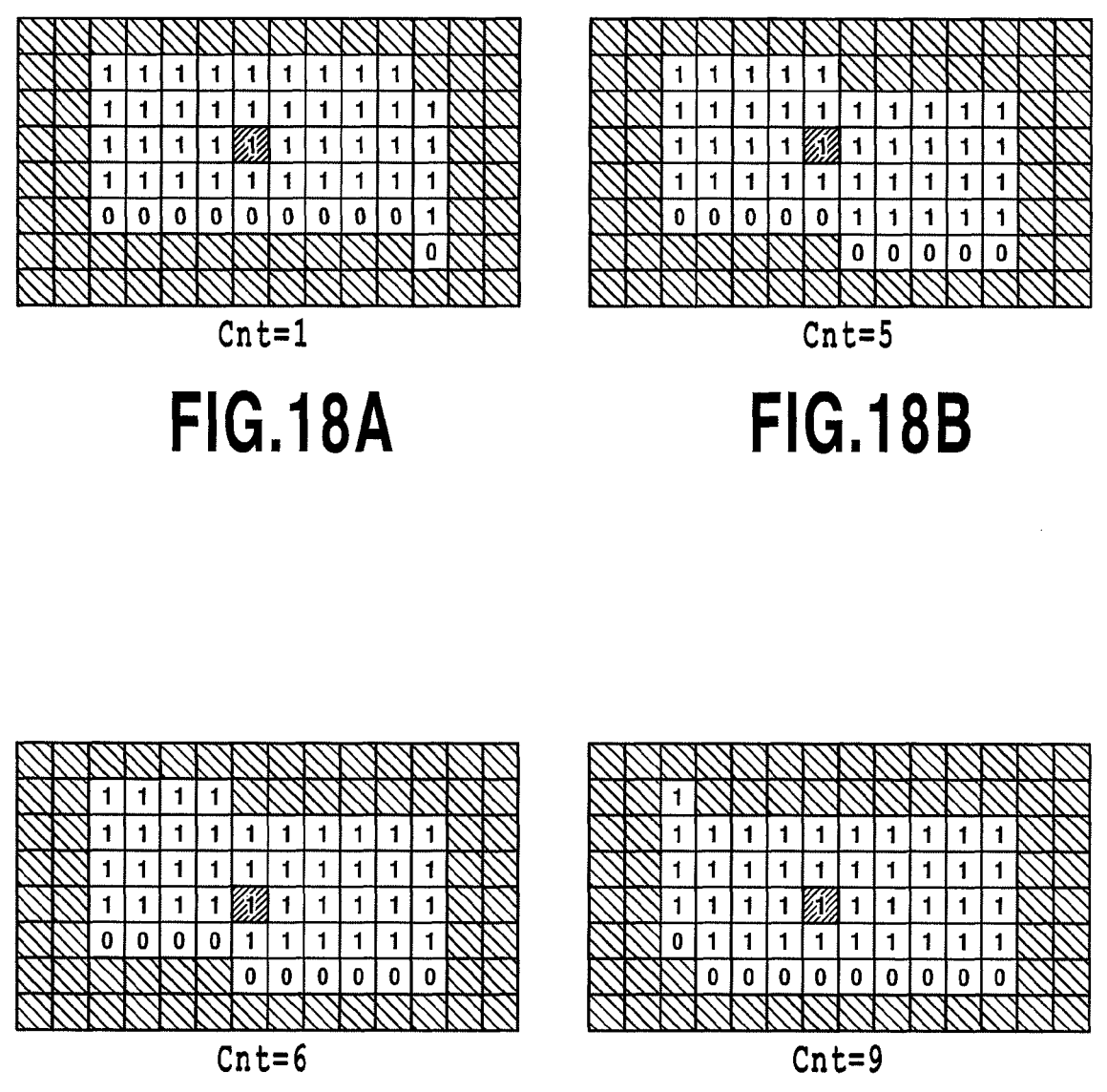

FIGS. 18A-18D show an example of pattern when a reference window includes a downward line shifting point, in the color image forming apparatus of the embodiment of this invention.

FIG. 19 shows a method of calculating corrected values when a result of decision made by a blending decision unit is a multivalue, in the color image forming apparatus of the embodiment of this invention.

DESCRIPTION OF THE EMBODIMENTS

Now, by referring to the accompanying drawings one preferred embodiment of this invention will be described. It is noted that the following embodiment in no way limits the present invention in terms of the scope of claim and that not all of the combinations of characteristics described in the embodiment are essentially required for the problem resolution means presented in this invention.

Figures 1, 1A:
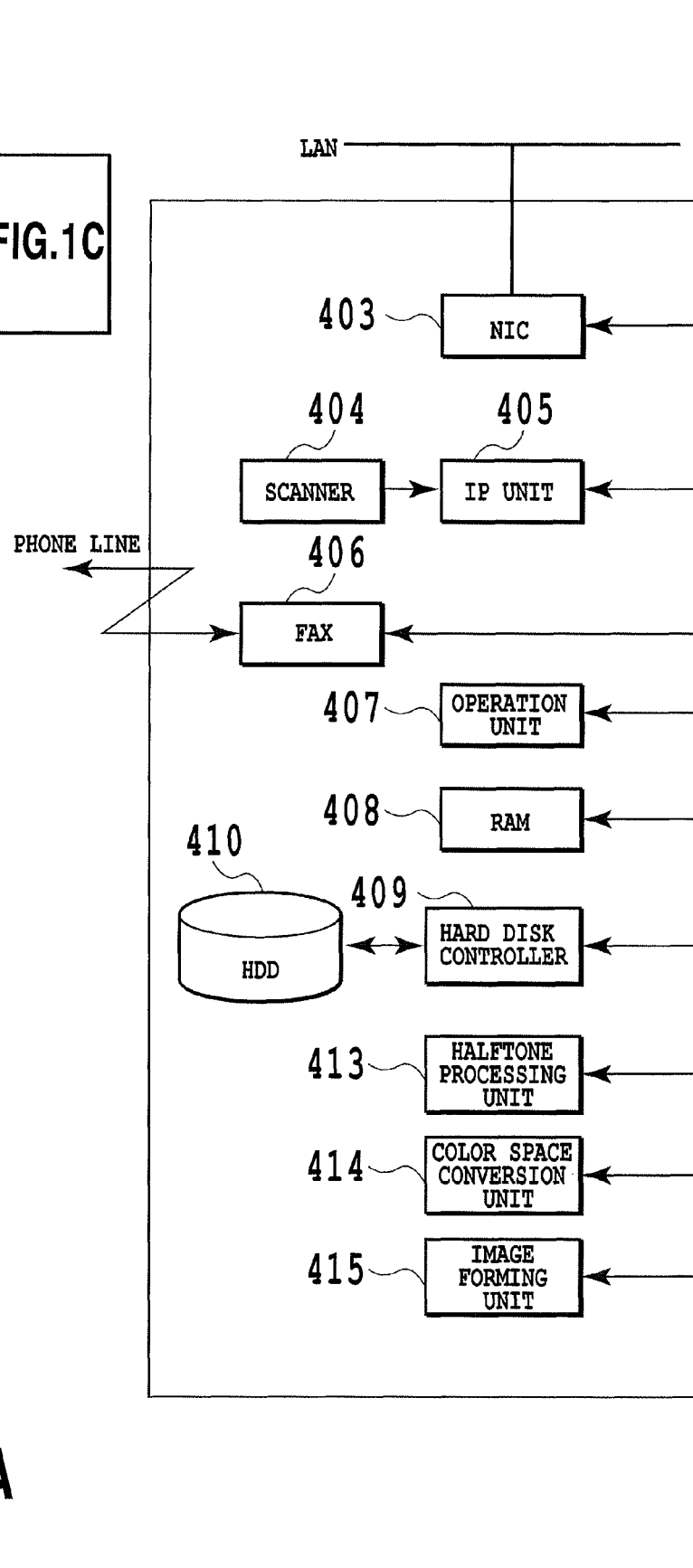
FIG. 1 is a diagram showing the relationship of FIGS. 1A, 1B, and 1C.
FIGS. 1A-1C are a block configuration diagram associated with an electrostatic latent image generation by a color image forming apparatus according to an embodiment of this invention.
Figure 1B:
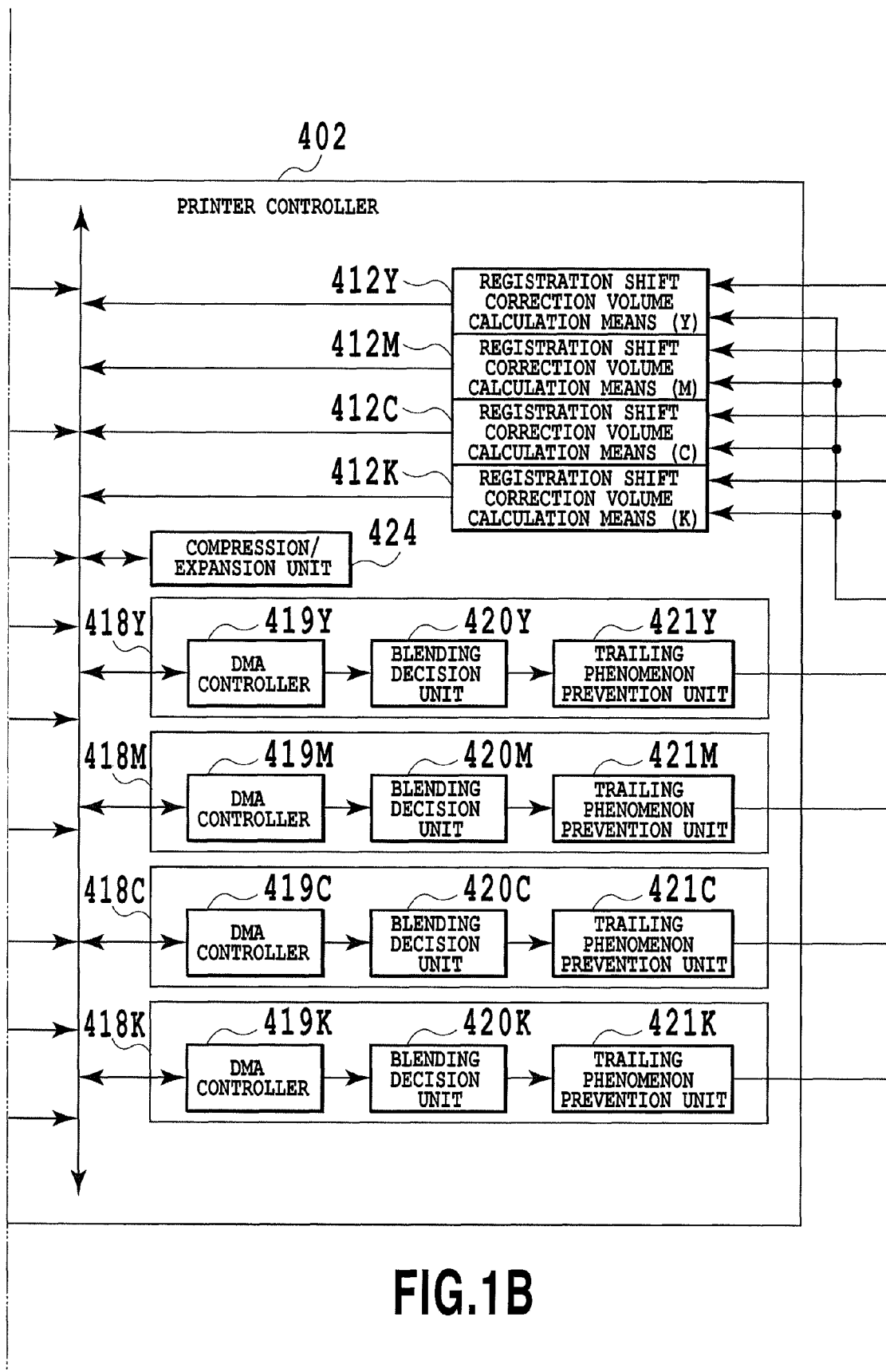
Figure 1C:
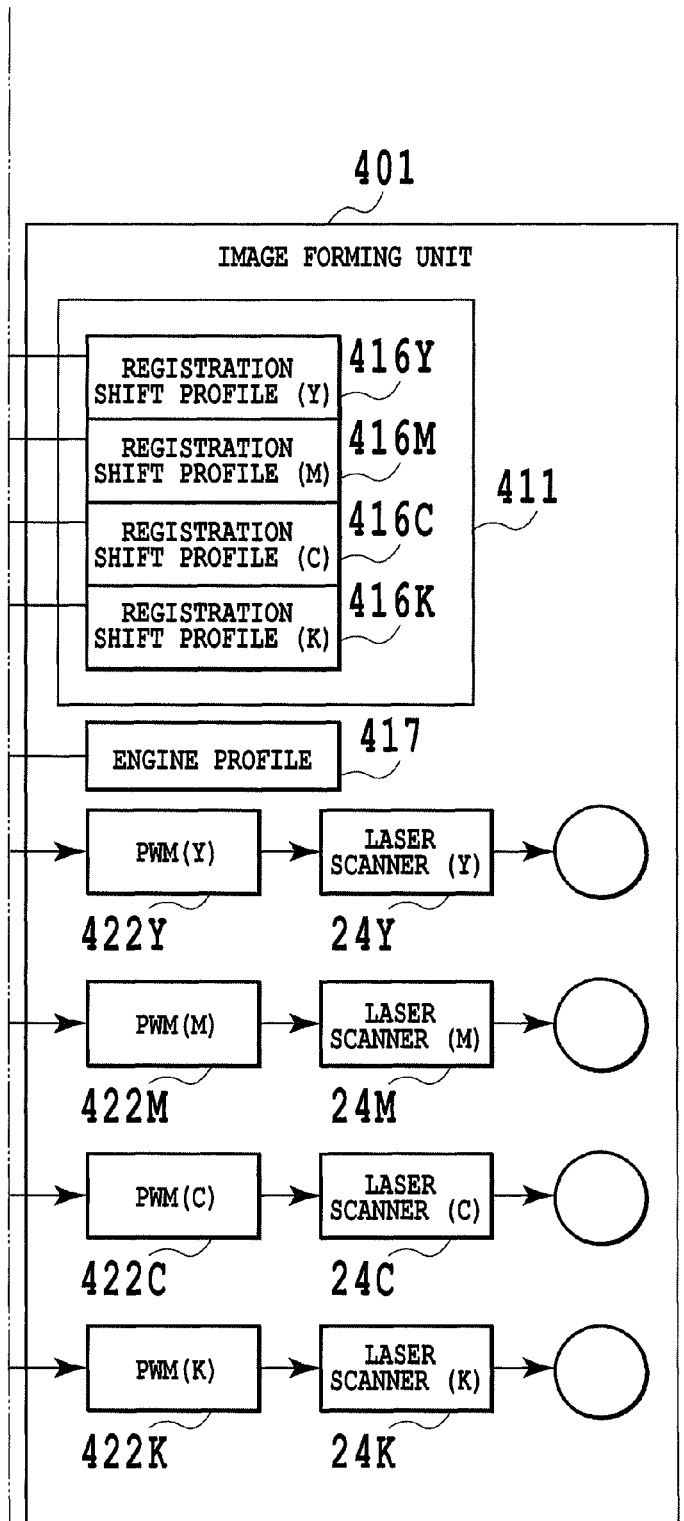

FIGS. 1A-1C are a block diagram showing a configuration of blocks associated with an electrostatic latent image forming function in an electrophotographic color image forming apparatus as embodiment 1.

The color image forming apparatus comprises an image forming unit 401 and a printer controller 402. The printer controller 402 creates bit map image information and the image forming unit 401, based the bit map image information, and forms an image on a print medium.

Figure 2:
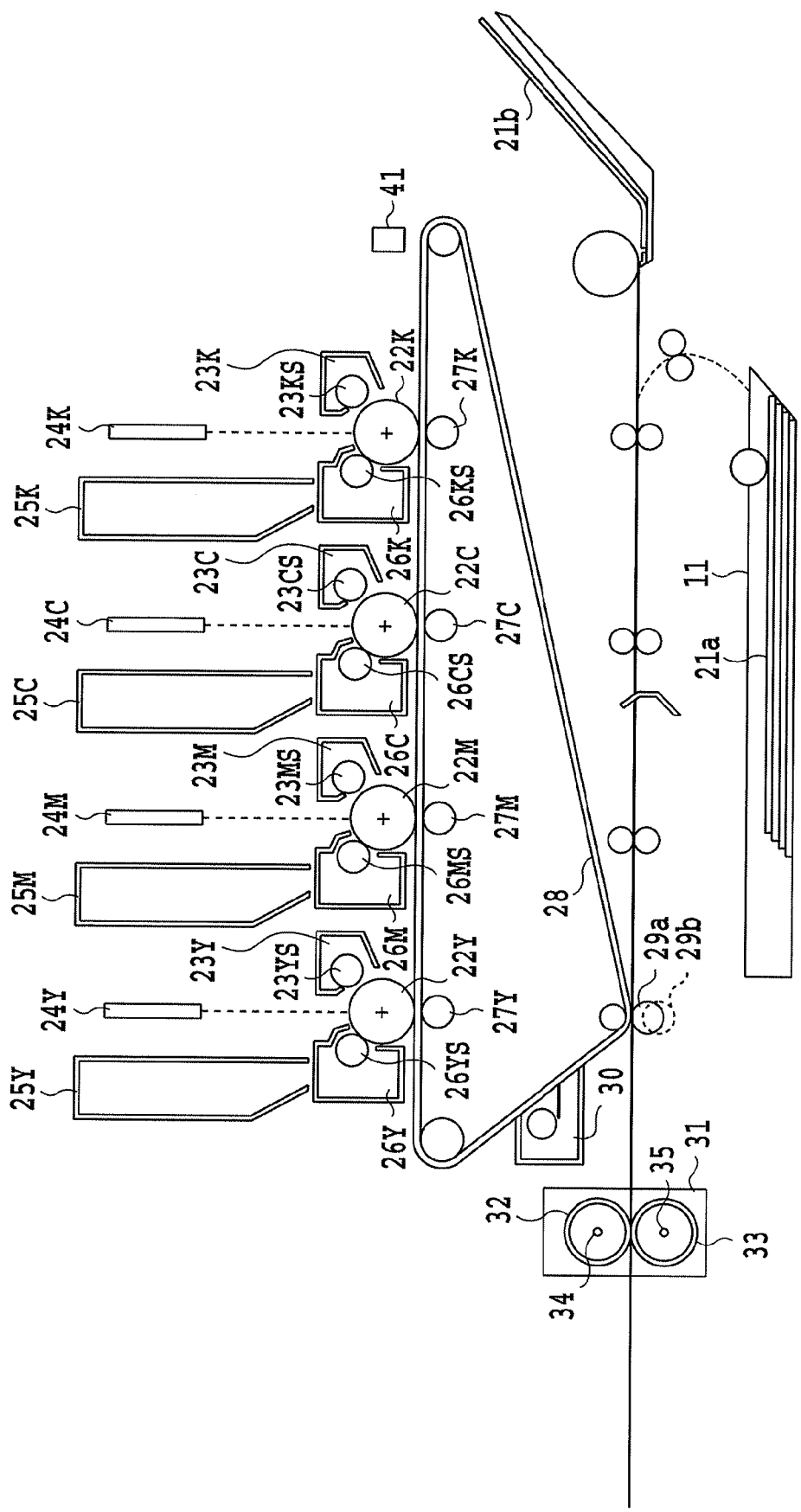
FIG. 2 is a cross-sectional view of the color image forming apparatus of the embodiment of this invention.

FIG. 2 is a cross-sectional view of a tandem type color image forming apparatus, an example of the electrophotographic color image forming apparatus that employs an intermediate transfer unit 28. Referring to FIG. 2, the operation of an image forming unit 401 in the electrophotographic color image forming apparatus will be explained.

The image forming unit 401, according to an exposure time determined by the printer controller 402, applies an exposure light to form an electrostatic latent image, and develops the electrostatic latent image to form a single color toner image. The image forming unit 401 superimposes the single color toner images of different colors to form a multicolor toner image, transfers this multicolor toner image onto a print medium 11 and fixes it on the print medium.

An electrostatic charging means has four electrostatic chargers 23Y, 23M, 23C, 23K in yellow (Y), magenta (M), cyan (C) and black (K) stations, respectively, to charge photosensitive drums 22Y, 22M, 22C, 22K. The electrostatic chargers have a sleeve 23YS, 23MS, 23CS, 23KS.

The photosensitive drums 22Y, 22M, 22C, 22K have an organic light conductive layer coated over an outer circumference of an aluminum cylinder. A drive motor not shown rotates the photosensitive drums 22Y, 22M, 22C, 22K counterclockwise according to the image forming operation.

An exposure means throws an exposure light from laser scanner units 24Y, 24M, 24C, 24K onto the photosensitive drums 22Y, 22M, 22C, 22K to selectively expose the surfaces of the photosensitive drums 22Y, 22M, 22C, 22K to form electrostatic latent images.

A developing means has four developers 26Y, 26M, 26C, 26K to develop images of yellow (Y), magenta (M), cyan (C) and black (K) at the respective stations, rendering the electrostatic latent images visible. Each developer has a sleeve 26YS, 26MS, 26CS, 26KS. The individual developers 26 can be detached.

A transfer means rotates the intermediate transfer unit 28 counterclockwise to transfer single toner images from the photosensitive drums 22 onto the intermediate transfer unit 28. As the photosensitive drums 22Y, 22M, 22C, 22K and primary transfer rollers 27Y, 27M, 27C, 27K, located opposite the photosensitive drums, rotate, the single color toner images are transferred. The primary transfer rollers 27 are applied a bias voltage and at the same time a rotation speed of the photosensitive drums 22 and a rotation speed of the intermediate transfer unit 28 are differentiated for effective transfer of single color toner images onto the intermediate transfer unit 28. This is referred to as a primary transfer.

Further, the transfer means superimposes the single color toner images on the intermediate transfer unit 28 at each station and, as the intermediate transfer unit 28 rotates, carries the superimposed multicolor toner image to a secondary transfer roller 29. The transfer means further picks up a print medium 11 from a paper supply tray 21 and carries it to the secondary transfer roller 29 where the multicolor toner image is transferred from the intermediate transfer unit 28 onto the print medium 11. The secondary transfer roller 29 is applied an appropriate bias voltage to electrostatically transfer the toner image. This is a secondary transfer. While the multicolor image is transferred onto the print medium 11, the secondary transfer roller 29 engages the print medium 11 at the position 29a and, after the transfer operation is finished, parts from the print medium and moves to a position 29b.

The fixing means has a fixing roller 32 to heat the print medium 11 and a pressure roller 33 to press the print medium 11 against the fixing roller 32. The fixing roller 32 and the pressure roller 33 are formed hollow and have heaters 34, 35 installed therein respectively. A fixing device 31 transports, by the fixing roller 32 and the pressure roller 33, the print medium 11 holding a multicolor toner image and at the same time applies heat and pressure to fix the toner on the print medium 11.

After toner fixing, the print medium 11 is then discharged onto a discharge tray by discharge rollers not shown. Now, the image forming operation is complete.

A cleaning means 30 clears the intermediate transfer unit 28 of remaining toner. Waste toner remaining on the intermediate transfer unit 28 after the four-color toner image has been transferred from the intermediate transfer unit 28 onto the print medium 11 is accumulated in a cleaner container.

Figure 3:
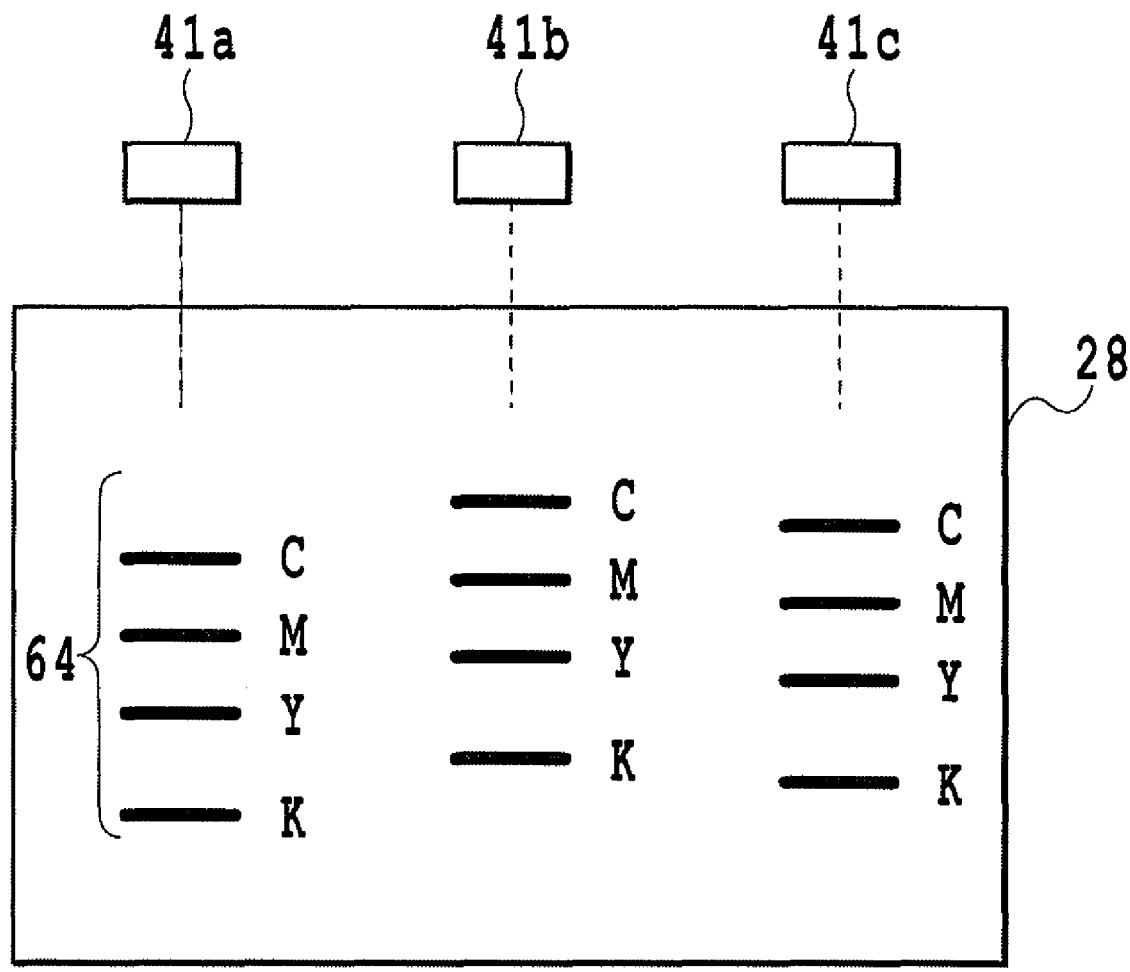
FIG. 3 is a schematic diagram showing an example of registration detection patch in the color image forming apparatus of the embodiment.
Figure 4:
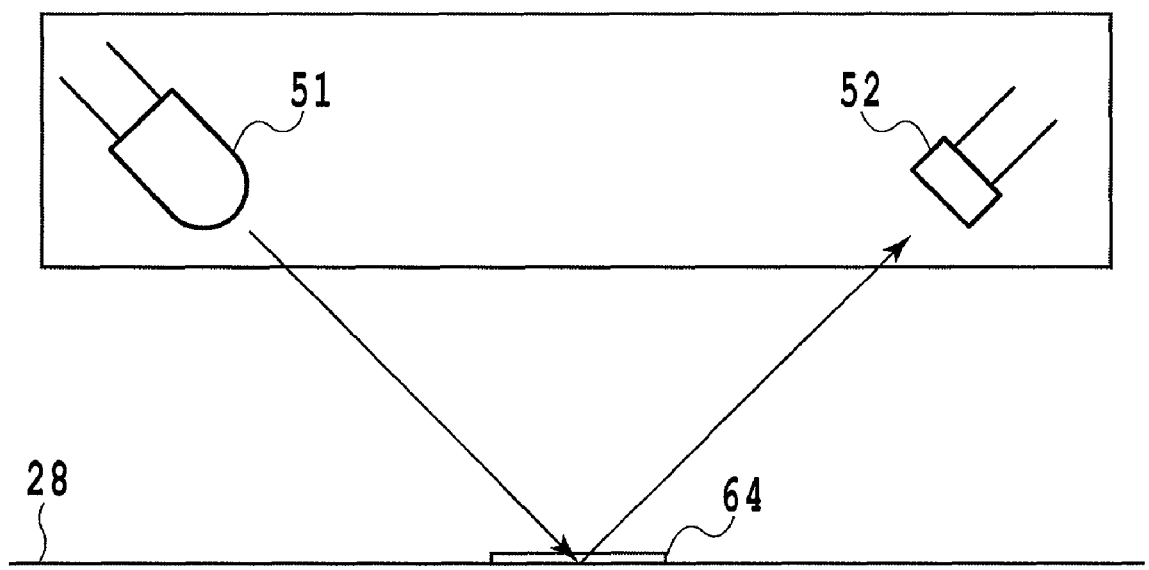
FIG. 4 is a schematic diagram showing an example configuration of a registration detection sensor in the color image forming apparatus of the embodiment of this invention.

Registration detection sensors 41 are located at positions facing the intermediate transfer unit 28. The intermediate transfer unit 28 is formed with registration detection patches 64 to determine the amount of registration shift for each color by using patch detection timings. FIG. 3 shows one such example in which three registration detection sensors 41a, 41b, 41c are arranged in the scan direction so that the registration detection patches 64 for C, M, Y, K colors pass directly below these sensors. By detecting registration shifts at three locations—left, center and right—in the scan direction as shown in FIG. 3, degrees of inclination and curvature of the scan line can be determined. In a color image forming apparatus having the registration detection sensors 41 only at two locations—left and right positions—only the degree of inclination can be determined. One example configuration of the registration detection sensor 41 is shown in FIG. 4. The registration detection sensor has an infrared light emitting element 51 such as LED, a light receiving element 52 such as photodiode, an IC not shown to process received light data, and a holder not shown to accommodate these. The light receiving element 52 detects an intensity of light reflected from the toner patches. Although FIG. 4 shows an arrangement to detect a specularly reflected light, other light such as randomly reflected light may be detected. For a coupling between the light emitting element 51 and the light receiving element 52, an optical element not shown, such as lens, may be used.

Figure 5:
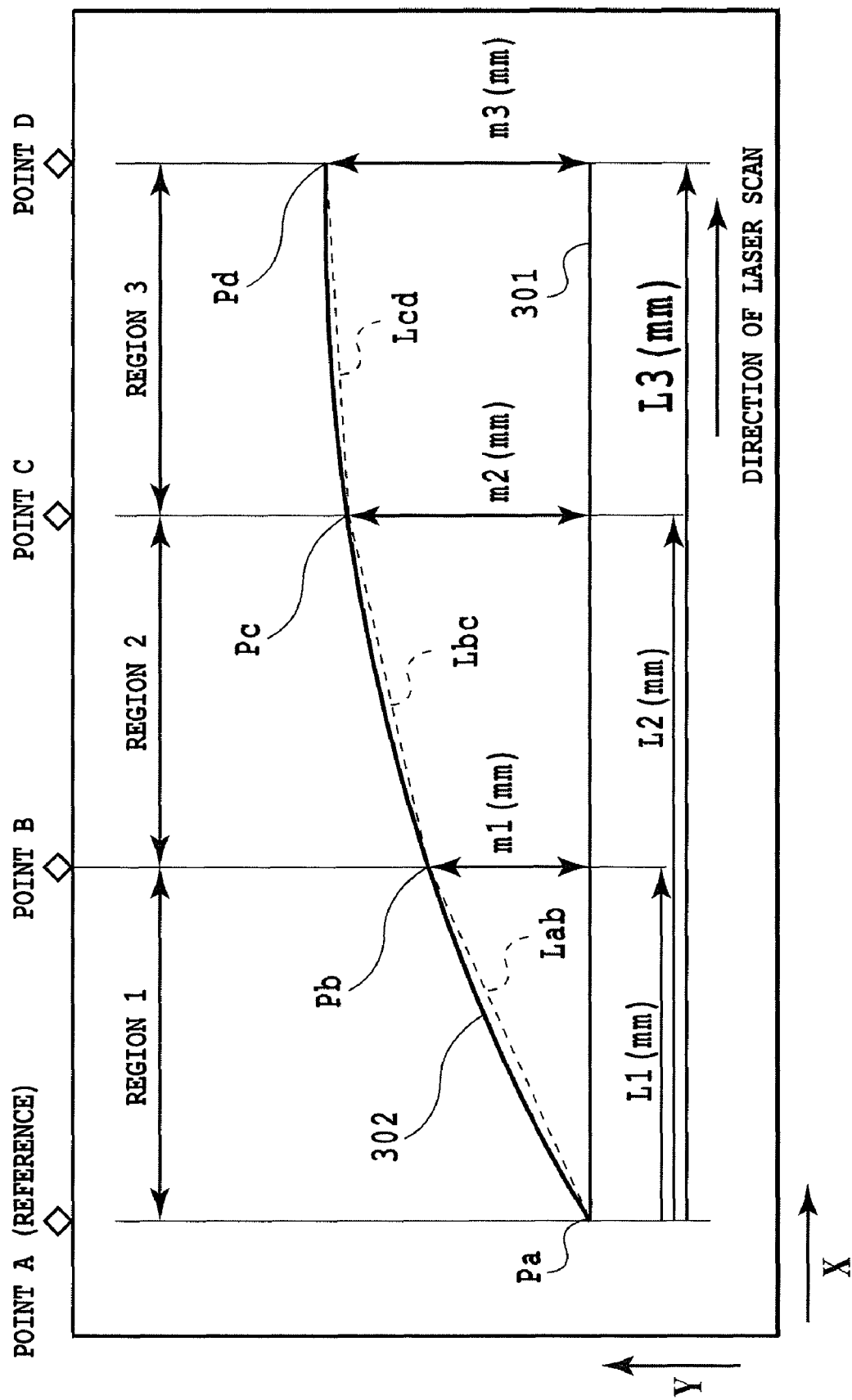
FIG. 5 is a diagram showing registration shifts in the color image forming apparatus of the embodiment of this invention.

Referring to FIG. 5, the registration shifts of a scan line will be explained. Denoted 301 is an ideal scan line along which a scan is performed vertical to the direction of rotation of the photosensitive drums 22. A real scan line denoted at 302 has an inclination and curve caused by position and diameter errors of the photosensitive drums 22 and by position errors of the optical system in the scanner unit 24 of each color. The magnitude of the inclination and curve of the scan line varies among C, M, Y and K image stations, which in turn causes registration shifts in a toner image of all colors transferred onto the intermediate transfer unit 28. In this embodiment, a scan start position in a print area in the main scan direction (X direction) is used as a reference point A and amounts of shift in the subscan direction between the ideal scan line 301 and the real scan line 302 are measured at a plurality of points (B, C and D). The print area is divided at the measuring points into a plurality of areas (Pa-Pb area as region 1, Pb-Pc area as region 2, and Pc-Pd area as region 3). The scan line inclination in each region is approximated by using straight lines (Lab, Lbc, Lcd) connecting these points. Thus, if a difference in the amount of shift between these points (m1 for region 1, m2-m1 for region 2 and m3-m2 for region 3) is a positive value; this indicates that the scan line in a region of interest inclines upwardly toward right. If the shift difference is a negative value, the scan line is shown to be inclined downwardly toward right.

Returning again to FIGS. 1A-1C, the configuration of the color image forming system according to this embodiment will be explained. A NIC (Network Interface Card) is denoted by reference numeral 403 and functions as an interface between an external computer and the printer controller 402 via a network.

A scanner 404 scans an original image and transfers image data corresponding to the scanned original image to an IP unit 405 or image processing unit.

A FAX 406 expands compressed image data received through a phone line by a compression/expansion unit 424 and transfers the expanded data. The FAX also transmits the image data compressed by the compression/expansion unit 424 through a phone line. The image data to be transmitted or received can be saved temporarily in a hard disk 410.

An operation unit 407 has various user interface and can be operated to make the image forming apparatus perform a desired operation.

A RAM 408 temporarily saves image data transmitted from the scanner 404 or NIC 403 and is also used as a work memory for CPU (not shown).

Reference numeral 409 denotes a hard disk controller connected to the hard disk 410. The hard disk controller 409 stores the image data compressed by the compression/expansion unit 424 in the hard disk 410 along with its ID (identifier) number for search. The hard disk controller 409, based on code data entered from a computer (not shown) described later or operation unit 407 and then transferred, searches for compressed data in the hard disk 410, retrieves and transfers the compressed image data again. The hard disk 410 may also store a control program for operating the image forming apparatus.

Next, an operation performed by an image processing unit in the color image forming apparatus will be explained. The image generation unit 415, using the print data received from the computer (not shown), generates printable raster image data and outputs them for each pixel as RGB data and also as attribute data representing data attribute of each pixel. Reference numeral 414 denotes a color space conversion unit which converts the RGB data into CMYK data according to toner colors of the image forming unit 401 and which, after the CMYK data has been half-toned by a half-toning unit 413, stores it in the RAM 408. The RAM 408, as described above, temporarily saves raster image data to be printed and is a page memory to store one page of image data or a band memory to store a plurality of lines of data.

Reference numerals 418C, 418M, 418Y, 418K denote printer interfaces (I/Fs) that basically control the positions of images and convert an image output format. The printer I/F comprises a DMA controller 419, a blending decision unit 420 and a trailing phenomenon prevention unit 421 that executes the trailing phenomenon prevention operation. The DMA controller 419 performs a subscan direction line shifting to correct registration shifts caused by the inclined and curved scan line. The blending decision unit 420 checks whether or not to perform the blending operation. This embodiment is characterized in that the trailing phenomenon prevention unit 421 is placed behind the blending decision unit 420. This arrangement allows the result of decision made by the blending decision unit 420 to be used by the trailing phenomenon prevention unit 421. The operation of each printer I/F will be detailed later. Then, the image whose registration shifts have been corrected is transferred to the image forming unit 401 where it is subjected to an image correction of less than 1 pixel by the blending unit (not shown). As a last step, pulse width modulation (PWM) means 422C, 422M, 422Y, 422K convert the image into exposure times of laser scanner units 24C, 24M, 24Y, 24K.

Next, the method of correcting registration shifts according to this embodiment will be detailed by referring to FIG. 1A-1C. An outline of the processing flow is as follows.

Step 1. Registration shift profile information 416Y-416K is stored in a registration shift volume memory means 411.

Step 2. Based on the registration shift profile information 416Y-416K and engine profile information 417, a correction volume is calculated for each pixel and for each color by a registration shift correction volume calculation means 412C-412K.

Step 3. Based on the correction volume calculated for each pixel, the DMA controller 419 executes bit map data correction according to the registration shifts.

The above steps 1-3 are each explained as follows.

In step 1, the registration shift profile information 416Y-416K is stored in the registration shift volume memory means 411 mounted in the image forming unit 401. The profile, as shown in FIG. 5 for example, may be in the form of an amount of shift in the subscan direction between the real scan line 302 and the ideal scan line 301, as measured at a plurality of points for each color. The table of FIG. 12 is one example of information stored in the registration shift volume memory means 411. The form of the profile is not limited to this and other forms may be used as long as they show inclination and curve characteristics of the scan line.

In step 2, the registration shift correction volume calculation means 412 calculates a correction volume to offset registration shifts, based on the registration shift profile information 416Y-416K stored in the registration shift volume memory means 411. This correction volume will be used later by the DMA controller 419, the blending decision unit 420 and the trailing phenomenon prevention unit 421. If we let coordinate data in the main scan direction be x (dots) and a subscan direction registration shift correction volume be $\Delta y$ (dots), an equation to determine the correction volume for each region in FIG. 5 is shown as follows (image forming resolution is assumed to be r (dpi)).

$$\Delta y1 = x*(m1/L1) \qquad \text{Region 1}$$

$$\Delta y2 = m1/r + (x-(L1/r))*((m2-m1)/(L2-L1)) \qquad \text{Region 2}$$

$$\Delta y3 = m2/r + (x-(L2/r))*((m3-m2)/(L3-L2)) \qquad \text{Region 3}$$

L1, L2 and L3 are distances (in mm) measured in the main scan direction from the print start position to the right end of the region 1, region 2 and region 3, respectively. m1, m2 and m3 are shifts measured between the ideal scan line 301 and the real scan line 302 at the right end of the region 1, region 2 and region 3, respectively.

Inclination in each region can be determined from a deviation at the measuring point. At each pixel in all the regions, the value ys from the exposure unit profile data is given as follows.

$$\Delta ys = x*(m1/L)(0 \leq x < L1)$$

$$m1/r + (x-(L1/r))*((m2-m1)/(L2-L1)) \ (L1 \leq x < L1+L2)$$

$$m2/r + (x-(L2/r))*((m3-m2)/(L3-L2)) \ (L1+L2 \leq x \leq L1+L2+L3)$$

After ys is determined, a value of x is calculated at which ys reaches an integer dot with this image forming resolution. Using this x value, the vertical direction reading position for the DMA controller 419 is changed.

In step 3, based on the calculated correction volume for each pixel, the DMA controller 419 performs the bit map data correction. Based on the coordinate position data in the main scan direction and subscan direction and the correction volume $\Delta y$ obtained by the registration shift correction volume calculation means 412, the correction unit performs the registration shift correction, one pixel at a time, thereby reconfiguring the output image data.

Figure 6A:
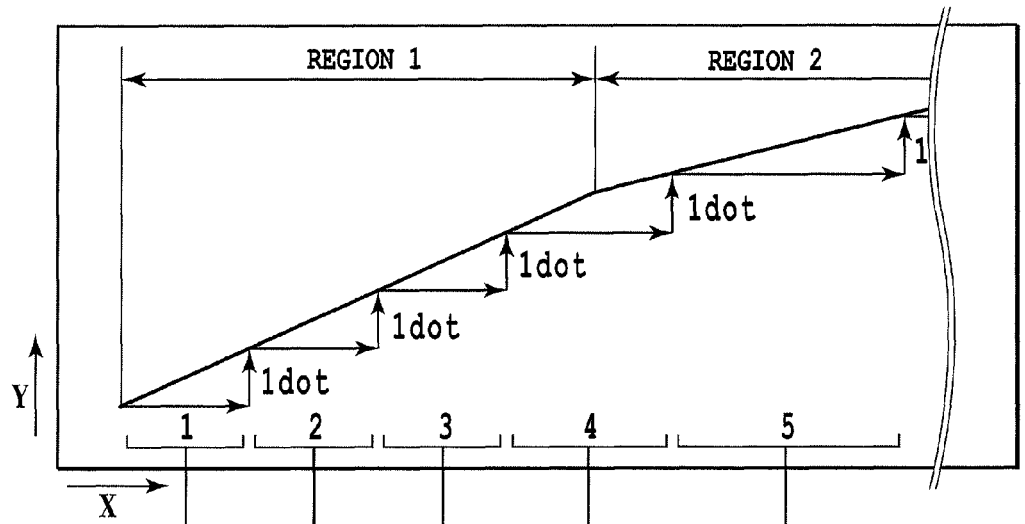
FIGS. 6A-6C illustrate a method of correcting registration shifts one pixel at a time in the color image forming apparatus of the embodiment of this invention.
Figure 6B:
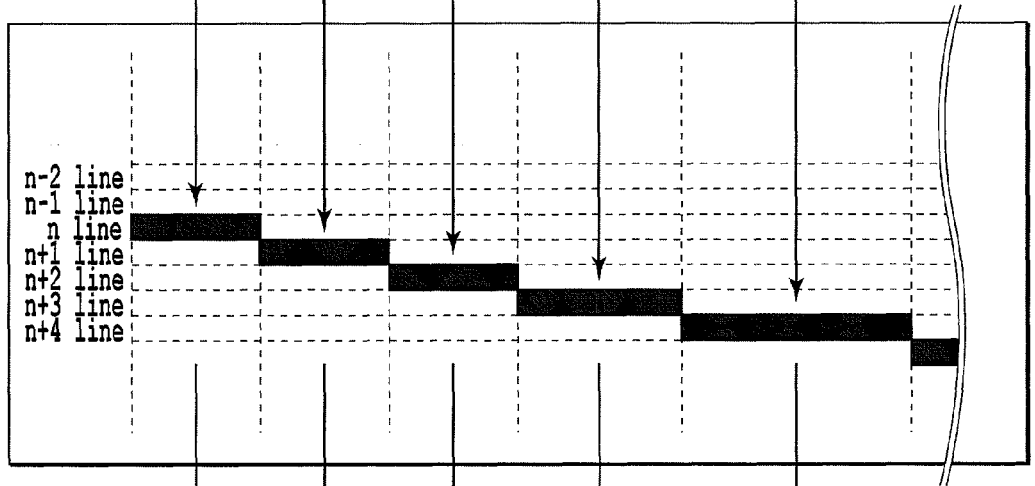
Figure 6C:
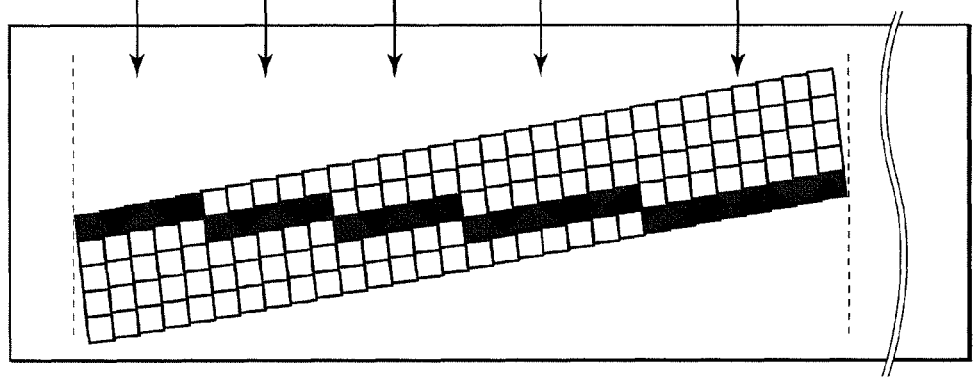

Referring to FIGS. 6A-6C, the registration shift correction or line shifting in units of one pixel by the DMA controller 419 will be explained. The DMA controller 419 offsets the coordinate in the subscan direction of image data according to a value of an integer part of the registration shift correction volume $\Delta y$ that is determined by the registration shift information of a scan line approximated by straight lines of FIG. 6A. Let us consider an example case in which, as shown in FIG. 6B, data whose subscan direction coordinate position is n-th line is to be reconfigured. Let the coordinate position in the main scan direction be X. In a region 1 at a coordinate X in the main scan direction, the registration shift correction volume $\Delta y$ is higher than and including 0 and less than 1 and data at n-th line is read from the RAM. In a region 2, the registration shift correction volume $\Delta y$ is higher than and including 1 and less than 2 and the coordinate conversion operation is done to read a bit map image at a position offset by 1 line, i.e., data which is located at (n+1)st line, from the RAM. Similarly, the coordinate conversion operation is performed to read data located at (n+2)nd line in a region 3 and data located at (n+3)rd line in a region 4. In this method the output image data is reconfigured. FIG. 6C shows how the image data that has undergone the registration shift correction in units of one pixel by the DMA controller 419 appears when exposed on an image carrier.

Referring to FIGS. 7A-7E, the registration shift correction of less than one pixel by the blending decision unit 420, i.e., the method of deciding whether or not to perform the registration shift correction whose correction volume $\Delta y$ is below a decimal point.

Figure 7A:
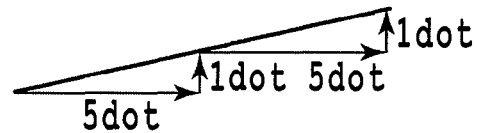
FIGS. 7A-7E illustrate a method of correcting registration shifts of less than 1 pixel in the color image forming apparatus of the embodiment of this invention.
Figure 7B:
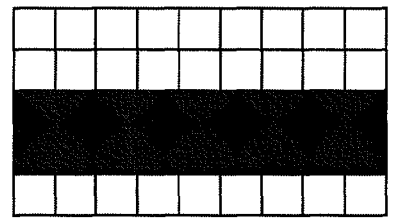
Figure 7C:
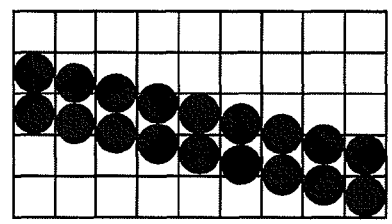

FIG. 7A is an image of a scan line inclined upward toward right. FIG. 7B is a bit map image of a horizontal straight line before its grayscale value is converted. FIG. 7C is a corrected image of FIG. 7B to offset the registration shift caused by the inclination of the scan line of FIG. 7A. To achieve the corrected image of FIG. 7C, grayscale values of pixels before and after the pixel of interest in the subscan direction are adjusted. Subsequently, the blending decision unit 420 decides whether or not to perform a smoothing interpolation operation, based on image checks such as screen, watermarking, pattern image and error diffusion. Here, the watermarking is a security technology for preventing duplication, which embeds concealed letters in image data so that the letters become visible when copied. If the image is found watermarked, the blending operation is not performed. This is to prevent the decoding of these images from being affected by the blending operation. The blending decision result is transferred to the image forming unit 401 along with the image data and the blending unit (not shown) now performs the interpolation operation of less than 1 pixel.

Figure 7D:
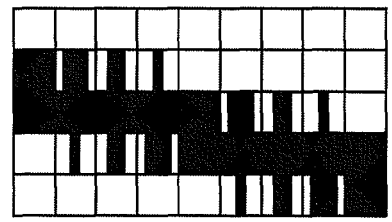
Figure 7E:
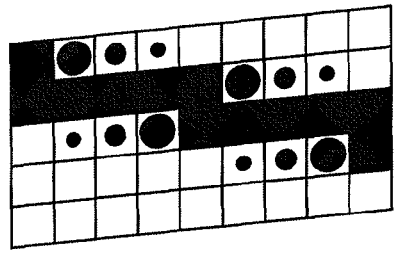
Figure 8:
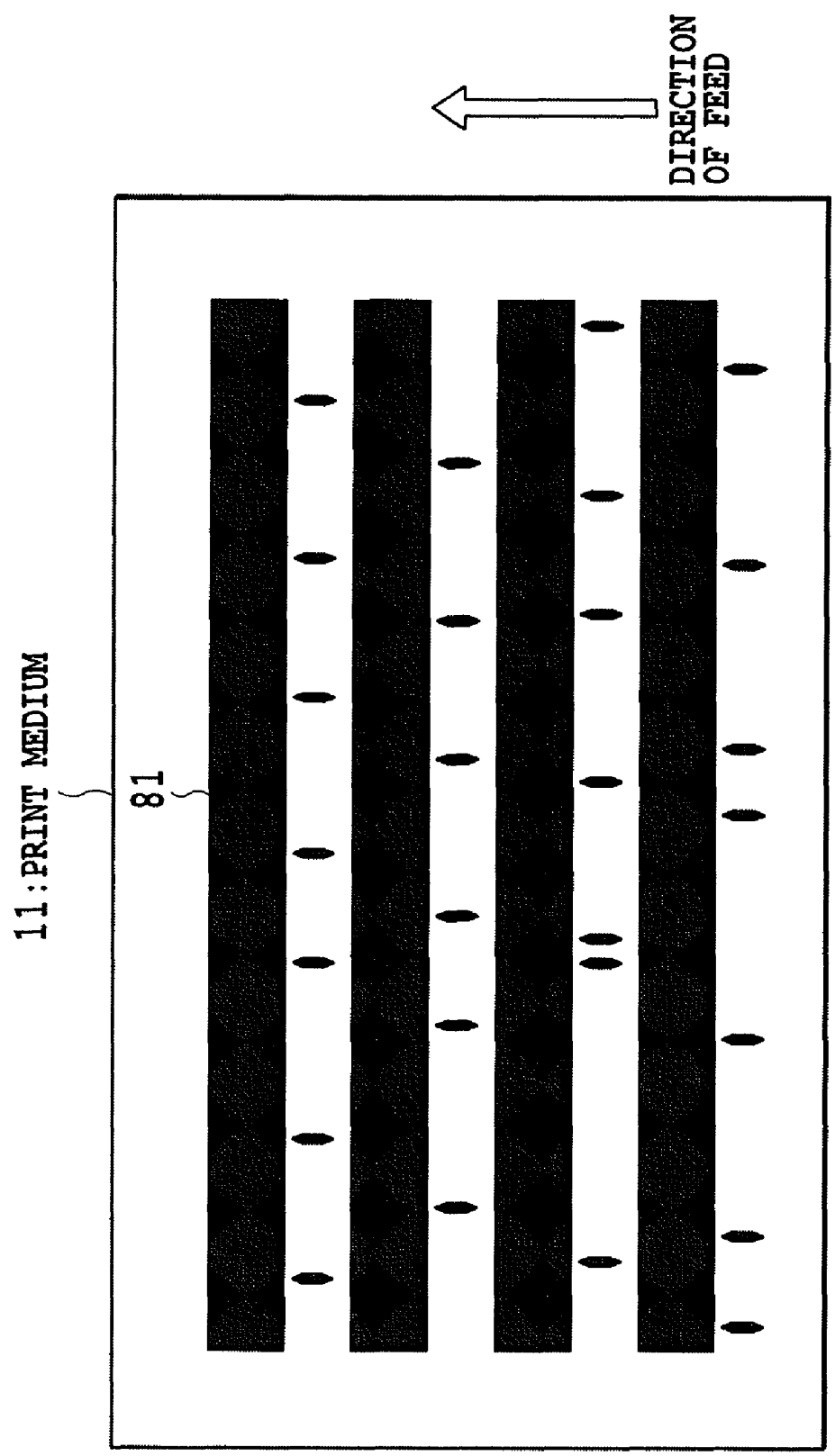
FIG. 8 is a printed image showing a trailing phenomenon observed in a conventional image forming apparatus.
Figure 9:
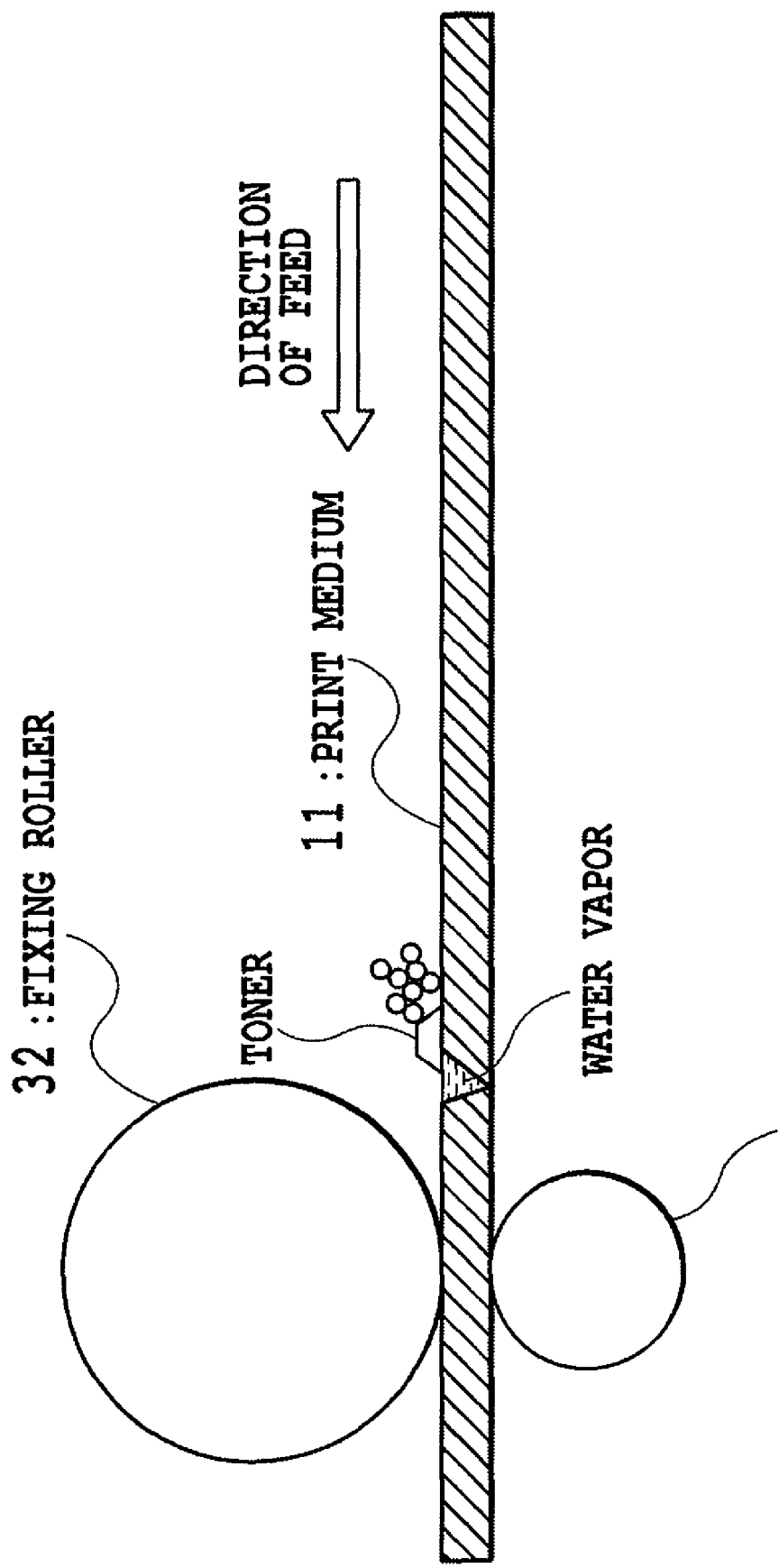
FIG. 9 is a schematic diagram showing how the trailing phenomenon occurs in the conventional image forming apparatus.
Figure 10A:
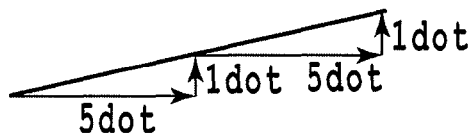
FIGS. 10A-10F shows a problem observed when the trailing phenomenon prevention operation is performed before a subscan direction line shifting and a blending decision.
Figure 10B:
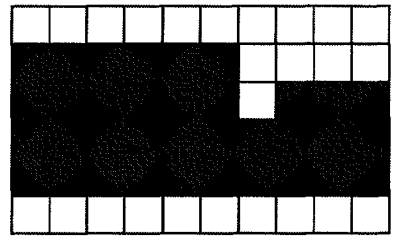
Figure 10C:
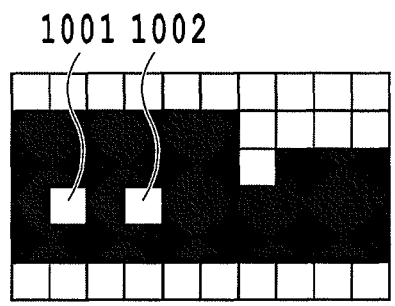
Figure 10D:
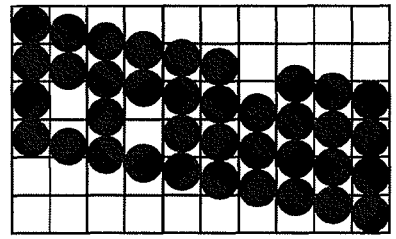
Figure 10E:
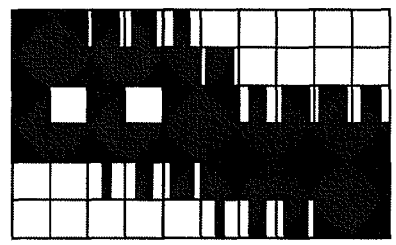
Figure 10F:
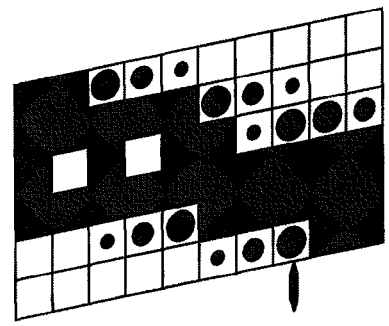
Figure 11:
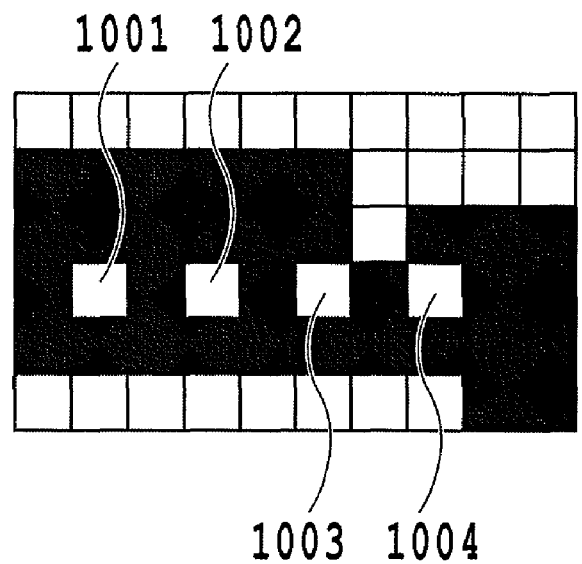
FIG. 11 shows pixels that should have been eliminated to cope with the problem shown in FIGS. 10A-10F.
Figure 13A:
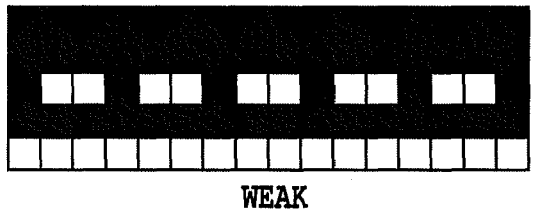
FIGS. 13A-13G show levels—strong, medium and weak of the trailing phenomenon prevention operation in the color image forming apparatus of the embodiment of this invention.
Figure 13D:
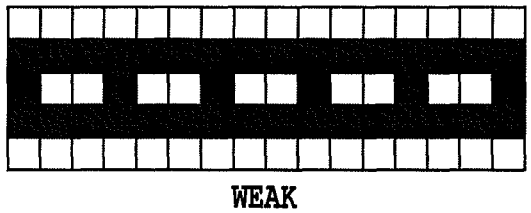
Figure 13B:
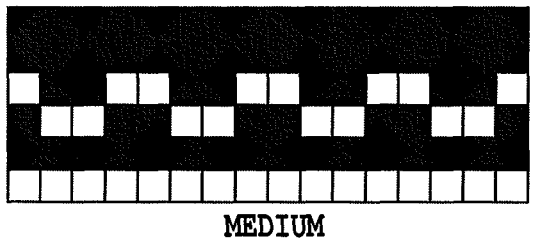
Figure 13E:
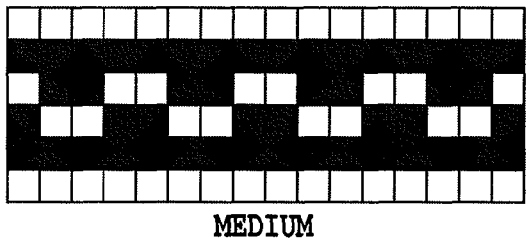
Figure 13C:
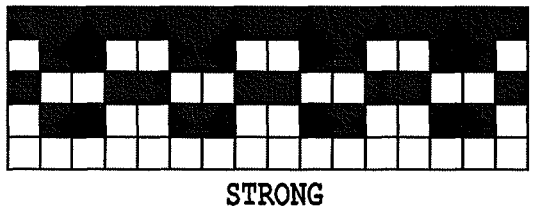
Figure 13F:
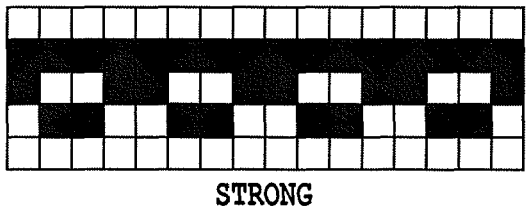
Figure 13G:
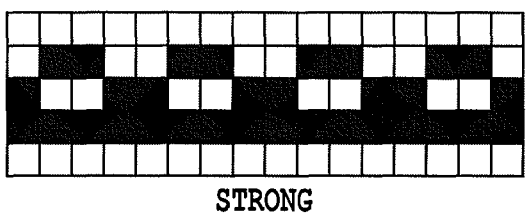

FIG. 7D is a bit map image that has undergone the interpolation operation of less than 1 pixel according to the result of decision made by the blending decision unit 420. FIG. 7E is an exposed image on an image carrier in which the incli-nation of the interpolated bit map image of the main scan line is offset, forming a horizontal straight line.

Next, the normal trailing phenomenon prevention operation will be explained. The normal trailing phenomenon prevention operation is divided into two operations—a pattern matching and a replacement operation. A reference window is generated from the image data and is matched against a plurality of trailing phenomenon decision patterns. If it matches one of the trailing phenomenon decision patterns, the pixel of interest is replaced with "0"; and if not, the pixel of interest is output as is. There are two or more matching patterns and, by combining these, it is possible to select a strong, medium or weak level of the trailing phenomenon prevention operation. Examples of combinations are shown in FIGS. 13A-13G.

In the color image forming apparatus of this invention, multivalued image data is transmitted to the image forming unit 401 for printing. Here, the multivalued image data refers to, for example, 2-bit pixels and 4-bit pixels. As described above, to perform the pattern matching with the trailing phenomenon decision patterns, the multivalued image data needs to be binarized first. A normal binarization technique involves setting a certain threshold and, if the pixel value is greater or equal to the threshold, the data is converted into '1' and, if not, into '0'. This is generally called a simple binarization. This simple binarization, however, has a problem that because the blending operation is done after the binarization, the pattern matching will be performed using a pixel value different from the one that is actually exposed. Therefore, in the matching process for preventing the trailing phenomenon, an erroneous decision may be made. To deal with this problem, this embodiment feeds back results of decision made by the blending decision units 420Y-420M to the binarization operation (quantization operation), before the pattern matching against the trailing phenomenon prevention patterns is executed. This makes an erroneous decision less likely to be made in the subsequent pattern matching.

Figures 14, 14A:
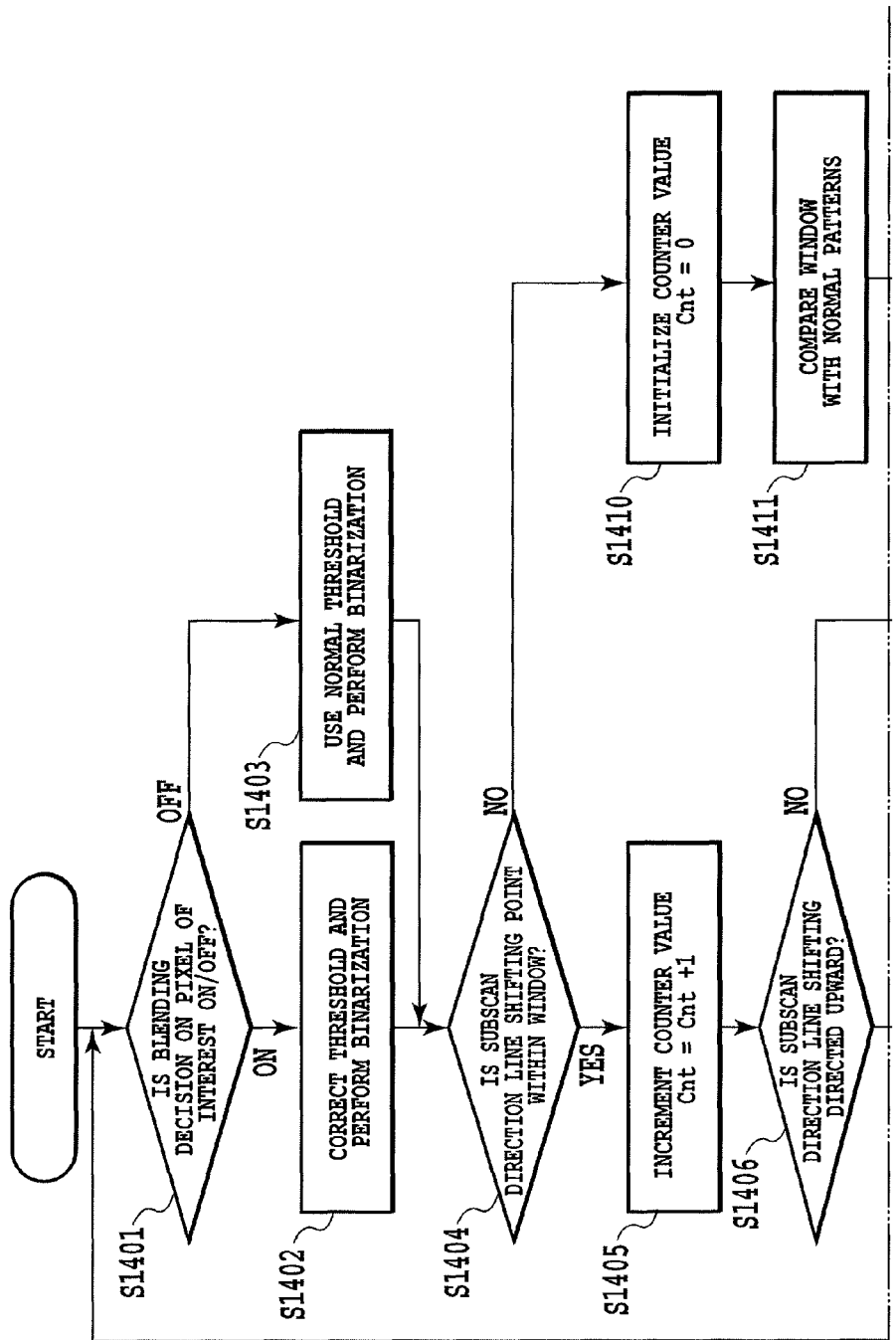
FIG. 14 is a diagram showing the relationship of FIGS. 14A and 14B.
FIGS. 14A-14B are a flow chart showing a training phenomenon prevention unit in the color image forming apparatus of the embodiment of this invention.
Figure 14B:
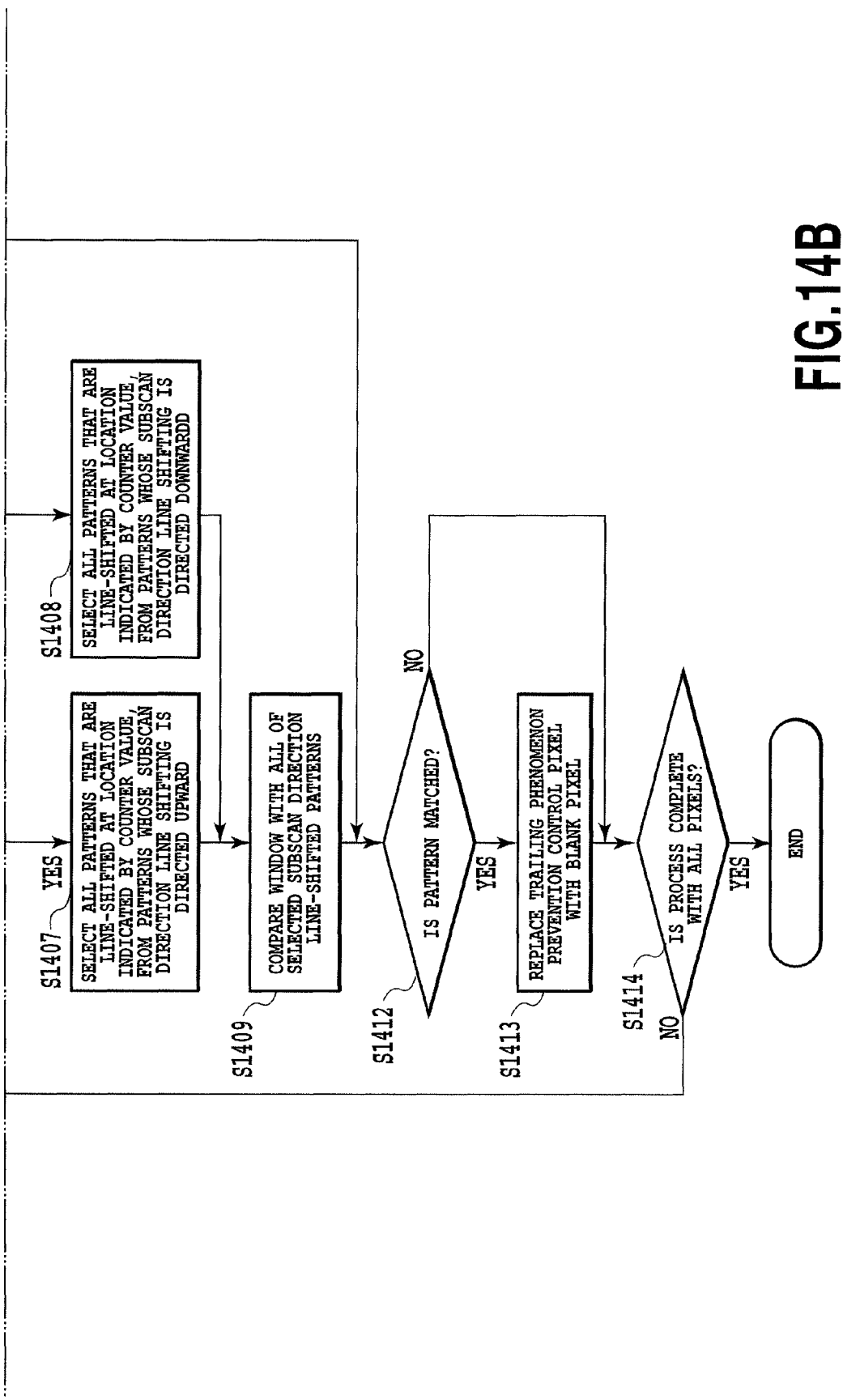

Next, a sequence of steps in the trailing phenomenon prevention operation in the color image forming apparatus of the embodiment of this invention will be explained by referring to the flow chart of FIG. 14A-14B and also to FIG. 15, FIGS. 16A-16D, FIGS. 17A-17D and FIGS. 18A-18D.

Figure 15:
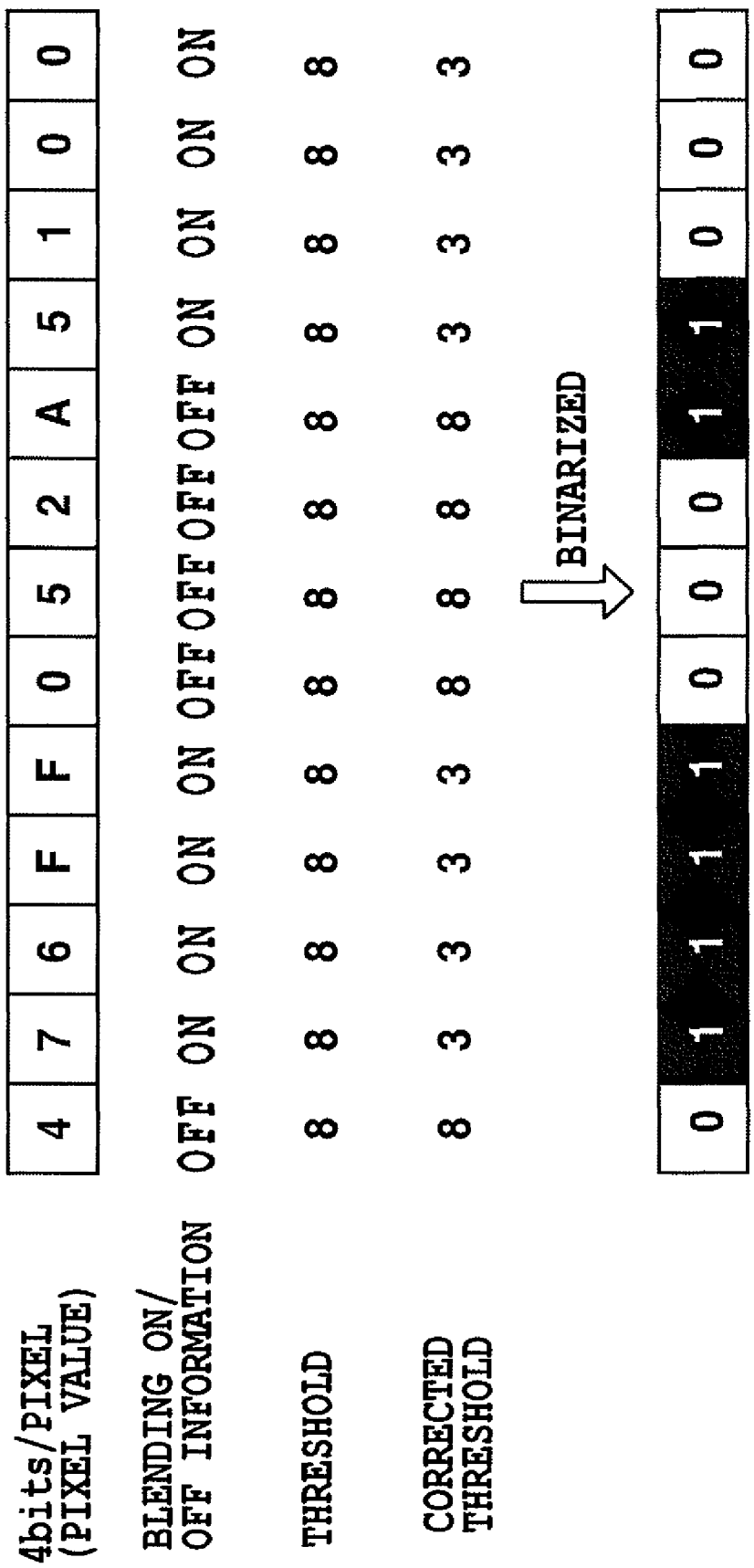
FIG. 15 shows processing of a binarization operation in the color image forming apparatus of the embodiment of this invention.

First at step S1401, a check is made as to whether the pixel of interest is decided as being required to undergo the blending operation. That is, the ON/OFF decision made by the blending decision unit 420 is checked. Depending on the ON/OFF decision for the blending operation, the threshold for binarization will change. If at step S1401 the blending decision result for the pixel of interest is ON, step S1402 corrects the threshold before performing the binarization operation. FIG. 15 shows an example of the binarization method performed at step S1402 and S1403. In this example, the threshold for binarization is set at '8'. It is noted, however, that for pixels with an ON decision for blending, the pixel value increases after being blended. So, the threshold to be used for the binarization of pixels with an ON blending decision is corrected. Here, the correction value is set to '5' when the blending is ON. In this case, for pixels whose blending decision is ON, the correction value of '5' subtracted from the original threshold of '8', i.e., '3', is used as a new threshold for the binarization operation. This arrangement makes the binarization more likely to result in '1'. If at step S1401 the pixel of interest has a blending decision of OFF, step S1403 uses the original threshold of '8' in performing the binarization operation. Although in this example the result of decision made by the blending decision unit 420 is 1-bit information, namely ON or OFF, if the decision result is multivalued, the following application can be made. If the decision result produced by the blending decision unit 420 has 2 bits, four levels of blending information can be presented. In this case, a correction value for binarization may be calculated by using a LUT (lookup table) such as shown in FIG. 19. The greater the decision result, the smaller the threshold will be, making the binarization operation more likely to result in '1'.

The binarized image data is then stored in a line memory (not shown) for the pattern matching in the trailing phenomenon prevention operation.

Next, the pattern matching operation for preventing the trailing phenomenon, from step S1404 on down, will be explained. The position of the subscan direction line shifting point is uniquely determined by the image forming unit 401. Further, whether the line shifting at the shifting point is directed upward or downward is also uniquely determined. Therefore, the trailing phenomenon prevention unit 421 also knows in advance at which pixel the line shifting occurs in which direction. First, at step S1404, a reference window is created from the binarized image data stored in the line memory (not shown). The reference window is required to have as many pixels (image data group) as used for pattern matching, for example, a size of 14×7 pixels. During the process of generating the reference window, a check is made to see whether the subscan direction line shifting point is included in the reference window. If the line shifting point is not included in the reference window, step S1410 initializes a counter (Cnt) that indicates where in the reference window a line shifting point lies. Then at step S1411 the reference window is matched against the patterns of the normal trailing phenomenon prevention operation (second patterns). That is, both of the patterns are compared to see if they match. There are two or more of the trailing phenomenon prevention operation patterns and the pattern matching is done for all of them. Examples are shown in FIGS. 16A-16D.

If step S1404 decides that the subscan direction line shifting point is included in the reference window, step S1405 increments the counter (Cnt) by 1. This indicates that the subscan direction line shifting point exists at the rightmost pixel of the reference window.

Figure 16A:
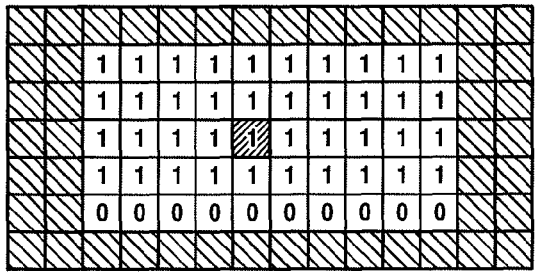
FIGS. 16A-16D show an example of pattern used for a pattern matching in the trailing phenomenon prevention operation in a conventional image forming apparatus.
Figure 16B:
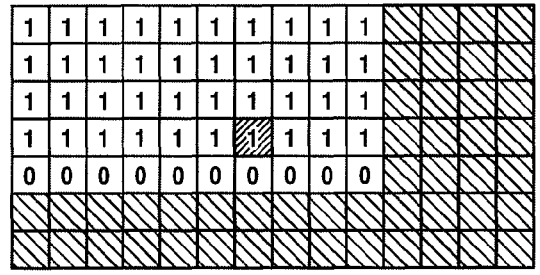
Figure 16C:
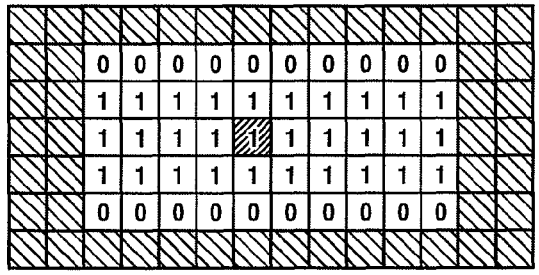
Figure 16D:
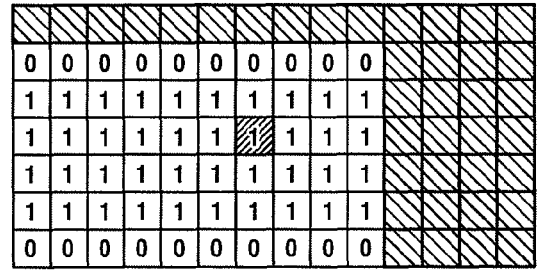
Figures 17A, 17B, 17C, 17D:
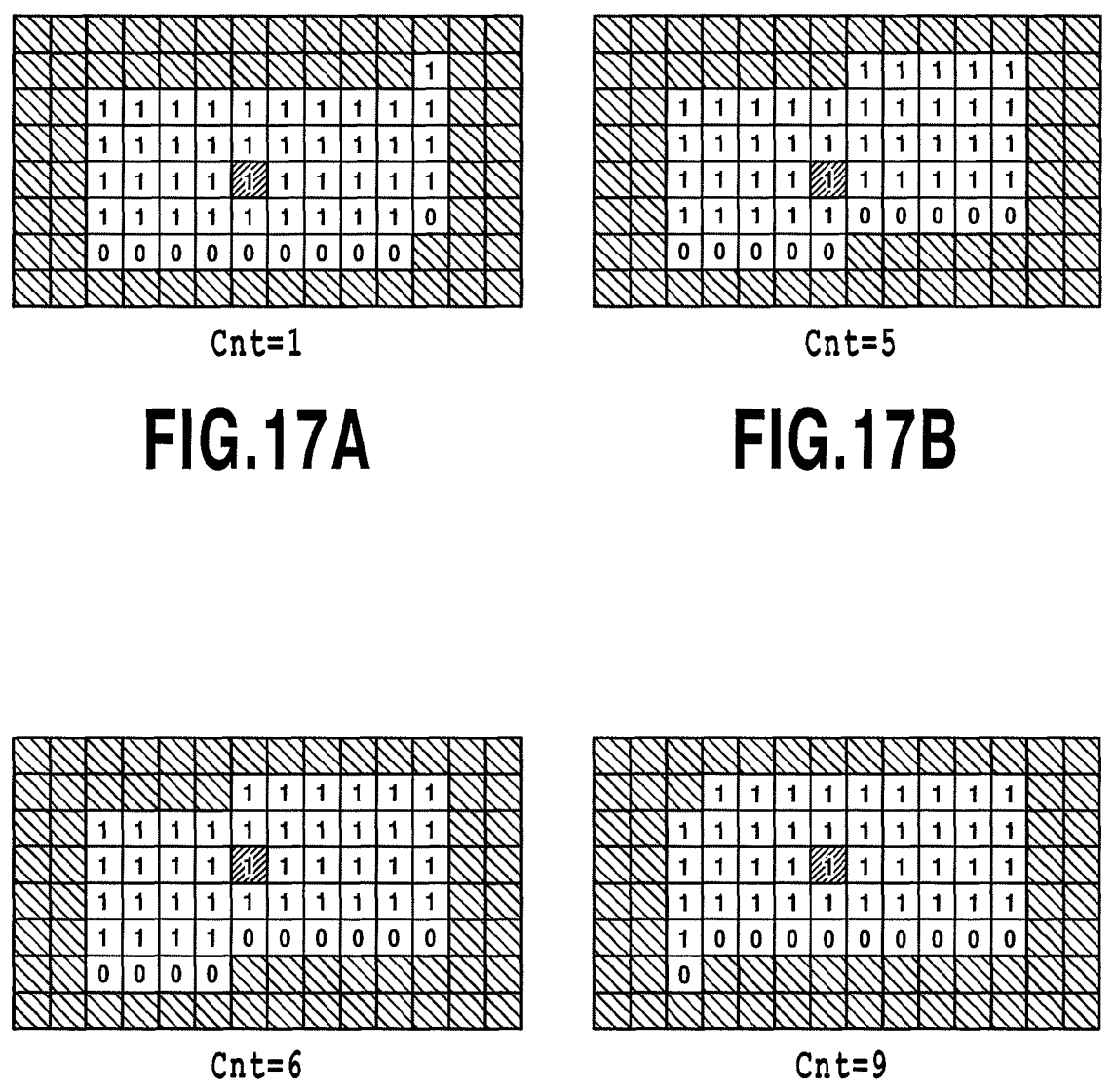

Next, at step S1406 a check is made as to whether the subscan direction line shifting is directed upward or downward. If the line shifting direction is upward, all the patterns that are shifted at a location represented by the value of the counter (Cnt) are chosen from the upward-shifted trailing phenomenon prevention patterns. At this time, since the trailing phenomenon prevention pattern has undergone the line shifting, it has one line more than the normal pattern, added thereto in the subscan direction. Therefore, if step S1404 finds that the subscan direction line shifting point is included in the reference window, one line is added also to the reference window to generate a new reference window. Assuming that the normal reference window has a size of 14×7, if a line shifting point is included in the window, the newly generated window (compatible to the second pattern) has a size of 14×8. If the pattern of FIG. 16A is taken for example, patterns such as shown in FIG. 17A-17D are selected according to the value of the counter (Cnt).

If step S1406 finds that the subscan direction line shifting is downward, all the patterns that are shifted at a location indicated by the value of the counter (Cnt) are chosen from the downward-shifted trailing phenomenon prevention patterns. If the pattern of FIG. 16A is taken for example, patterns such as shown in FIG. 18A-18D are selected according to the value of the counter (Cnt).

The reference window is matched against all the patterns (first patterns for line shifting) selected by step S1407 and S1408 (step S1409).

As a result of comparison by step S1409 or S1411, if at step S1412 both patterns are found to match, step S1413 performs a thinning operation on the multivalued data located at the pixel of interest. The thinning operation is to replace the multivalued data located at the pixel of interest in the original reference window with a blank pixel. If step S1412 finds that the reference window does not match any of the trailing phenomenon prevention patterns, the pixel of interest is output as is. By performing the above processing on all pixels, the trailing phenomenon prevention operation is done (step S1414).

In a color image forming apparatus that forms an image by correcting registration shifts during the image forming process by using image data, above embodiment produces an effect of being able to prevent a trailing phenomenon appropriately.

Further, since above embodiment feeds back the result of the blending decision to the process of determining the threshold for the binarization operation, an erroneous decision on the thinning operation for preventing the trailing phenomenon can be minimized.

Further, as for the subscan direction line shifting, the above embodiment prepares in advance line-shifted patterns for the prevention of trailing phenomenon, allowing for normal pattern matching.

As described above, with the above embodiment it is possible to perform the pattern matching normally and therefore prevent the training phenomenon.

Other Embodiments

This invention may also be realized by loading into a system or equipment a recording media that stores program codes of software that implements the functions of the above embodiment and by causing a computer to read the program codes from the recording media and execute them. The recording media is a computer-readable media. In this case, the program codes read from the recording media realize the function of the above embodiment, and the recording media storing the program codes constitute the invention. Further, the functions of the above embodiment may also be realized by causing an operating system (OS) running on the computer to execute a part or all of actual processing of the above embodiment according to instructions of the program codes. The above embodiment may also be realized by writing the program codes read from the recording media into a function expansion card or function expansion unit of a computer and by causing the function expansion card to execute a part or all of required processing according to instructions of the program codes.

When this invention is to be applied to the above recording media, a program code representing the flow chart explained above is stored in the recording media.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2008-039270, filed Feb. 20, 2008, which is hereby incorporated by reference herein in its entirety.

What is claimed is:

1. A color image forming apparatus constructed to form an image by correcting registration shifts during an image forming process by using image data, the color image forming apparatus comprising:

a means for correcting registration shifts by performing a subscan direction line shifting according to an amount of registration shifts;

a means for deciding whether or not to correct grayscale levels for interpolation of less than one pixel of image data, wherein one of a first threshold and a second threshold is used to quantize multivalued image data based on a result of the decision;

a means for generating a reference window comprising a group of the quantized image data;

a means for thinning a pixel of the multivalued image data located at a pixel of interest in the reference window, in a case where the reference window matches trailing phenomenon prevention patterns; and a means for correcting, for interpolation of less than one pixel of image data, grayscale levels of the thinned multivalued image data.

2. A color image forming apparatus constructed to form an image by correcting registration shifts during an image forming process by using image data, the color image forming apparatus comprising:

a registration means for correcting registration shifts by performing a subscan direction line shifting at a line shifting point according to an amount of registration shifts;

a binarizing means for deciding whether or not to correct grayscale levels of image data, wherein one of a first threshold and a second threshold is used to binarize multivalued image data based on a result of the decision;

a generating means for generating a reference window comprising a group of the binarized image data;

a checking means for checking whether the line shifting point is included in the generated reference window;

a selecting means for selecting a first trailing phenomenon prevention pattern for line shifting pattern matching in a case where the line shifting point is decided to be included in the reference window, and for selecting a second trailing phenomenon prevention pattern for normal pattern matching in a case where the line shifting point is decided to be not included in the reference window;

a comparing means for comparing the reference window with the first trailing phenomenon prevention pattern in a case where the line shifting point is decided to be included in the reference window, and for comparing the reference window with the second trailing phenomenon prevention pattern in a case where the line shifting point is decided to be not included in the reference window;

a thinning means for thinning a pixel of the multivalued image data located at the pixel of interest in the reference window, in a case where the comparison by the comparing means finds a match; and a correcting means for correcting, for interpolation of less than one pixel of image data, grayscale levels of the thinned multivalued image data.

3. The color image forming apparatus according to claim 2, wherein the binarizing means uses the first threshold for binarization in a case where the result of the decision indicates that the grayscale levels for the interpolation is corrected, and uses the second threshold for binarization in a case where the result of the decision indicates that the grayscale levels for the interpolation is not corrected, and wherein the second threshold is equal to a value corrected from the first value.

4. The color image forming apparatus according to claim 2, wherein the selecting means selects the first trailing phenomenon prevention pattern according to whether the line shifting is directed upward or downward or where in the reference window the line is shifted, and wherein the first trailing phenomenon prevention pattern is the second trailing phenomenon prevention pattern shifted at the line shifting point in a direction of the subscan direction line shifting.

5. The color image forming apparatus according to claim 2, wherein the generating means in a case where the line shifting point is decided to be included in the reference window, adds one line to the reference window and extracts an image pattern from the reference window.

6. A color image forming method for forming an image by correcting registration shifts during an image forming process by using image data, the color image forming method comprising:

a registration step to correct registration shifts by performing a subscan direction line shifting at a line shifting point according to an amount of registration shifts;

a binarizing step to decide whether or not to correct grayscale levels of image data, wherein one of a first threshold and a second threshold is used to binarize multivalued image data based on a result of the decision;

a generating step to generate a reference window comprising a group of the binarized image data;

a checking step to check whether the line shifting point is included in the generated reference window;

a selecting step to select a first trailing phenomenon prevention pattern for line shifting pattern matching in a case where the line shifting point is decided to be included in the reference window, and to select a second trailing phenomenon prevention pattern for normal pattern matching in a case where the line shifting point is decided to be not included in the reference window;

a step to compare the reference window with the first trailing phenomenon prevention pattern in a case where the line shifting point is decided to be included in the reference window, and to compare the reference window with the second trailing phenomenon prevention pattern in a case where the line shifting point is decided to be not included in the reference window;

a thinning step to thin a pixel of the multivalued image data located at a pixel of interest in the reference window, in a case where the comparison by the comparing means finds a match; and a correcting step to correct, for interpolation of less than one pixel of image data, grayscale levels of the thinned multivalued image data.

7. The color image forming method according to claim 6, wherein the binarizing step uses the first threshold for binarization in a case where the result of the decision indicates that the grayscale levels for the interpolation is corrected, and uses the second threshold for binarization in a case where the result of the decision indicates that the grayscale levels for the interpolation is not corrected, and wherein the second threshold is equal to a value corrected from the first value.

8. The color image forming method according to claim 6, wherein the selecting step selects the first trailing phenomenon prevention pattern according to whether the line shifting is directed upward or downward or where in the reference window the line is shifted, and wherein the first trailing phenomenon prevention pattern is the second trailing phenomenon prevention pattern shifted at the line shifting point in a direction of the subscan direction line shifting.

9. The color image forming method according to claim 6, wherein the generating step in a case where the line shifting point is decided to be included in the reference window, adds one line to the reference window and extracts an image pattern from the reference window.

10. A computer-readable recording medium having computer-executable instructions for performing a color image forming method, the color image forming method forming an image by correcting registration shifts during an image forming process by using image data, the method comprising the steps of:

correcting registration shifts by performing a subscan direction line shifting at a line shifting point according to an amount of registration shifts;

deciding whether or not to correct grayscale levels of image data, wherein one of a first threshold and a second threshold is used to binarize multivalued image data based on a result of the decision;

creating a reference window comprising a group of the binarized image data;

checking whether the line shifting point is included in the generated reference window;

selecting a first trailing phenomenon prevention pattern for line shifting pattern matching in a case where the line shifting point is decided to be included in the reference window, and selecting a second trailing phenomenon prevention pattern for normal pattern matching in a case where the line shifting point is decided to be not included in the reference window;

comparing the reference window with the first trailing phenomenon prevention pattern in a case where the line shifting point is decided to be included in the reference window, and comparing the reference window with the second trailing phenomenon prevention pattern in a case where the line shifting point is decided to be included in the reference window; and thinning a pixel of the multivalued image data located at a pixel of interest in the reference window in a case where the comparison by the comparing step finds a match; and correcting, for interpolation of less than one pixel of image data, grayscale levels of the thinned multivalued image data.

* * * * *